United States Patent
Matsumura et al.

(10) Patent No.: US 12,232,136 B2
(45) Date of Patent: Feb. 18, 2025

(54) TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 392 days.

(21) Appl. No.: 17/767,354

(22) PCT Filed: Oct. 11, 2019

(86) PCT No.: PCT/JP2019/040325
§ 371 (c)(1),
(2) Date: Apr. 7, 2022

(87) PCT Pub. No.: WO2021/070391
PCT Pub. Date: Apr. 15, 2021

(65) Prior Publication Data
US 2022/0377784 A1    Nov. 24, 2022

(51) Int. Cl.
*H04L 12/00* (2006.01)
*H04L 5/00* (2006.01)
*H04W 72/1273* (2023.01)
*H04W 72/23* (2023.01)

(52) U.S. Cl.
CPC .......... *H04W 72/23* (2023.01); *H04L 5/0048* (2013.01); *H04L 5/0082* (2013.01); *H04W 72/1273* (2013.01)

(58) Field of Classification Search
CPC .............. H04W 72/23; H04W 72/1273; H04L 5/0048; H04L 5/0082; H04L 5/005; H04L 5/0053; H04L 5/0044
USPC .................................................. 370/312, 336
See application file for complete search history.

(56) References Cited

U.S. PATENT DOCUMENTS

| | | | |
|---|---|---|---|
| 2014/0119266 A1* | 5/2014 | Ng | H04L 27/2602 370/312 |
| 2015/0257130 A1 | 9/2015 | Lee et al. | |
| 2019/0141693 A1 | 5/2019 | Guo et al. | |
| 2019/0182085 A1 | 6/2019 | Nory et al. | |
| 2019/0260425 A1* | 8/2019 | Ji | H04L 5/0091 |

(Continued)

FOREIGN PATENT DOCUMENTS

| | | | | |
|---|---|---|---|---|
| CA | 2865770 A1 * | 10/2013 | ........... | H04B 1/7115 |
| VN | 10036737 B * | 8/2023 | ............... | H04B 7/08 |

(Continued)

OTHER PUBLICATIONS

Extended European Search Report issued in counterpart European Application No. 19948621.8 mailed on Jun. 5, 2023 (13 pages).

(Continued)

*Primary Examiner* — Frantz Coby
(74) *Attorney, Agent, or Firm* — Osha Bergman Watanabe & Burton LLP

(57) ABSTRACT

A terminal includes a receiving section configured to receive downlink control information that schedules or triggers a specific signal, and a control section configured to use different quasi-co-location (QCL) parameters for the specific signal between a case where the specific signal is started within a first period for decoding the downlink control information and a case where the specific signal is started within a second period after the first period.

20 Claims, 11 Drawing Sheets

(56) References Cited

U.S. PATENT DOCUMENTS

2020/0008231 A1* 1/2020 Vilaipornsawai ..... H04W 72/21
2021/0392515 A1* 12/2021 Raghavan ......... H04W 72/0446

FOREIGN PATENT DOCUMENTS

| WO | 2019/093764 A1 | 5/2019 | |
|---|---|---|---|
| WO | WO-2019097482 A1 * | 5/2019 | ........... H04B 7/0413 |
| WO | WO-2019126573 A2 * | 6/2019 | ........... H01S 5/0657 |

OTHER PUBLICATIONS

Intel Corporation; "Summary for simultaneous Tx and Rx of channels and RS"; 3GPP TSG RAN WG1 Meeting #95, R1-1813896; Spokane, USA; Nov. 12-16, 2018 (10 pages).
H. Huawei; "Clarification of QCL assumption for PDSCH reception"; 3GPP TSG RAN WG1 Meeting #98, R1-1909439; Prague, Czech Republic; Aug. 26-30, 2019 (4 pages).
International Search Report issued in PCT/JP2019/040325 on Apr. 21, 2020 (1 page).
Written Opinion of the International Searching Authority issued in PCT/JP2019/040325 on Apr. 21, 2020 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in Indian Patent Application No. 202217021335, mailed on Aug. 12, 2024 (6 pages).

* cited by examiner

TERMINAL AND RADIO COMMUNICATION METHOD

TECHNICAL FIELD

The present disclosure relates to a terminal and a radio communication method in next-generation mobile communication systems.

BACKGROUND ART

In the universal mobile telecommunications system (UMTS) network, the specifications of long term evolution (LTE) have been drafted for the purpose of further increasing data rates, providing low delays, and so on (see Non Patent Literature 1). In addition, the specifications of LTE-Advanced (third generation partnership project (3GPP) Release (Rel.) 10 to 14) have been drafted for the purpose of further increasing capacity and advancement of LTE (3GPP Rel. 8 and 9).

Successor systems to LTE (for example, also referred to as 5th generation mobile communication system (5G), 5G+ (plus), New Radio (NR), or 3GPP Rel. 15 or later) are also being studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010.

SUMMARY OF INVENTION

Technical Problem

In a future radio communication system (for example, NR), it has been studied that a user terminal (terminal, a user terminal, user equipment (UE)) controls transmission/reception processing on the basis of information regarding quasi-co-location (QCL).

However, it is not clear how to determine a QCL parameter to be used for receiving a downlink (DL) signal or transmitting an uplink (UL) signal. If the UE does not operate using an appropriate QCL parameter, degradation of system performance such as decrease in throughput may occur.

Thus, an object of the present disclosure is to provide a terminal and a radio communication method for appropriately determining a QCL parameter.

Solution to Problem

A terminal according to an embodiment of the present disclosure includes a receiving section configured to receive downlink control information that schedules or triggers a specific signal, and a control section configured to use different quasi-co-location (QCL) parameters for the specific signal between a case where the specific signal is started within a first period for decoding the downlink control information and a case where the specific signal is started within a second period after the first period.

Advantageous Effects of Invention

According to one aspect of the present disclosure, it is possible to appropriately determine a QCL parameter.

Figure 1:
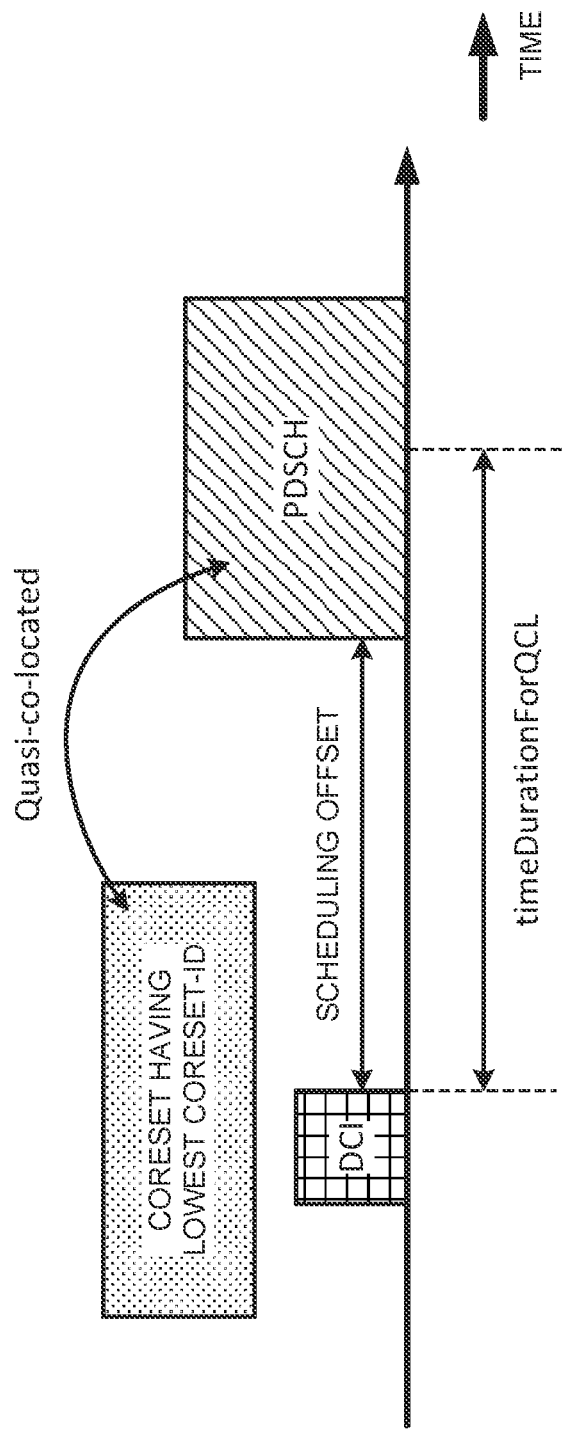
FIG. 1 is a diagrams illustrating an example of a QCL assumption of a PDSCH.

DESCRIPTION OF EMBODIMENTS (TCI, Spatial Relation, and QCL)

In NR, it has been studied to control reception processing (for example, at least one of reception, demapping, demodulation, and decoding) and transmission processing (for example, at least one of transmission, mapping, precoding, modulation, and coding) in UE of at least one of a signal and a channel (expressed as a signal/channel) based on a transmission configuration indication state (TCI state).

The TCI state may represent what is applied to a downlink signal/channel. One corresponding to the TCI state applied to an uplink signal/channel may be expressed as a spatial relation.

The TCI state is information regarding a quasi-co-location (QCL) of the signal/channel, and may also be referred to as, for example, a spatial Rx parameter, spatial relation information, or the like. The TCI state may be configured in the UE for each channel or each signal.

The QCL is an indicator indicating a statistical property of a signal/channel. For example, when one signal/channel and another signal/channel have a QCL relation, this may mean that it is possible to assume that the plurality of different signals/channels have at least one identical property out of Doppler shift, Doppler spread, average delay, delay spread, or spatial parameter (for example, spatial Rx parameter) (a QCL relation is established regarding at least one of these).

Note that, the spatial Rx parameter may correspond to a reception beam of the UE (for example, a reception analog beam), and the beam may be specified on the basis of spatial QCL. The QCL (or at least one element of the QCL) in the present disclosure may be replaced with the spatial QCL (sQCL).

A plurality of types of QCL (QCL types) may be defined. For example, four QCL types A to D with different parameters (or parameter sets) that can be assumed to be identical may be provided. These parameters (which may be referred to as QCL parameters) are as follows:

QCL type A (QCL-A): Doppler shift, Doppler spread, average delay, and delay spread;
QCL type B (QCL-B): Doppler shift and Doppler spread;
QCL type C (QCL-C): Doppler shift and average delay; and
QCL type D (QCL-D): spatial Rx parameter.

It may be referred to as a QCL assumption for the UE to assume that a predetermined control resource set (CORESET), channel, or reference signal has a specific QCL (for example, QCL type D) relation with another CORESET, channel, or reference signal.

UE may determine, based on a TCI-state of a signal/channel or QCL assumption, at least one of a transmission beam (Tx beam) and a reception beam (Rx beam) of the signal/channel.

The TCI state may be, for example, information regarding the QCL of a target channel (in other words, a reference signal (RS) for the channel) and another signal (for example, another RS). The TCI state may be configured (instructed) by higher layer signaling, physical layer signaling, or a combination thereof.

In the present disclosure, higher layer signaling may be, for example, any of radio resource control (RRC) signaling, medium access control (MAC) signaling, broadcast information, and the like, or a combination thereof.

For example, a MAC control element (MAC CE), a MAC protocol data unit (PDU), or the like may be used for the MAC signaling. The broadcast information may be, for example, a master information block (MIB), a system information block (SIB), remaining minimum system information (RMSI), other system information (OSI), or the like.

The physical layer signaling may be, for example, downlink control information (DCI).

A channel for which a TCI state or spatial relation is configured (specified) may be, for example, at least one of a Physical Downlink Shared Channel (PDSCH), a Physical Downlink Control Channel (PDCCH), a Physical Uplink Shared Channel (PUSCH), and a Physical Uplink Control Channel (PUCCH).

Furthermore, an RS having a QCL relation with the channel may be, for example, at least one of a Synchronization Signal Block (SSB), a Channel State Information Reference Signal (CSI-RS)), a measurement reference signal (Sounding Reference Signal (SRS)), a tracking CSI-RS (also referred to as a Tracking Reference Signal (TRS)), and a QCL detection reference signal (also referred to as a QRS).

The SSB is a signal block including at least one of a primary synchronization signal (PSS), a secondary synchronization signal (SSS), and a physical broadcast channel (PBCH). The SSB may be referred to as an SS/PBCH block.

An information element of the TCI state configured by higher layer signaling ("TCI-state IE" of RRC) may include one or a plurality of pieces of QCL information ("QCL-Info"). The QCL information may include at least one of information regarding the RS having a QCL relation (RS related information) and information indicating a QCL type (QCL type information). The RS related information may include information such as an index of the RS (for example, an SSB index or a non-zero-power (NZP) CSI-RS resource identifier (ID)), an index of a cell where the RS is located, or an index of a bandwidth part (BWP) where the RS is located.

In Rel. 15 NR, both an RS of the QCL type A and an RS of the QCL type D, or only the RS of the QCL type A may be configured for the UE as a TCI state of at least one of the PDCCH or the PDSCH.

When the TRS is configured as the RS of the QCL type A, in the TRS, different from a Demodulation Reference Signal (DMRS) of the PDCCH or the PDSCH, it is assumed that the same TRS is periodically transmitted for a long time. The UE can measure the TRS and calculate an average delay, a delay spread, and the like.

In the UE for which the TRS is configured as the RS of the QCL type A in the TCI state of the DMRS of the PDCCH or the PDSCH, it can be assumed that parameters (the average delay, the delay spread, and the like) of the QCL type A are the same between the DMRS of the PDCCH or the PDSCH and the TRS, and thus, the parameters (the average delay, the delay spread, and the like) of the type A of the DMRS of the PDCCH or the PDSCH can be obtained from a measurement result of the TRS. When performing channel estimation of at least one of the PDCCH or the PDSCH, the UE can perform channel estimation with higher accuracy using the measurement result of the TRS.

The UE for which the RS of the QCL type D is configured can determine a UE reception beam (spatial domain reception filter, UE spatial domain reception filter) by using the RS of the QCL type D.

An RS of QCL type X in a TCI state may mean an RS in a QCL type X relation with (DMRS of) a certain channel/signal, and this RS may be referred to as a QCL source of QCL type X in the TCI state.

<TCI State for PDCCH>

The information regarding PDCCH (or DMRS antenna port associated with PDCCH) and QCL with a predetermined RS may be referred to as the TCI state for PDCCH or the like.

The UE may determine a TCI state for a UE-specific PDCCH (CORESET) on the basis of higher layer signaling. For example, for the UE, one or a plurality of (K) TCI states may be configured by RRC signaling for each CORESET.

In the UE, one of the plurality of TCI states configured by the RRC signaling may be activated by a MAC CE, for each CORESET. The MAC CE may be referred to as a TCI state indication for UE-specific PDCCH MAC CE. The UE may monitor a CORESET on the basis of an active TCI state corresponding to the CORESET.

<TCI State for PDSCH>

Information regarding QCL of a PDSCH (or a DMRS antenna port associated with the PDSCH) and a predetermined DL-RS may be referred to as a TCI state for the PDSCH.

The UE may notify (configure) M (M≥1) TCI states for PDSCH (QCL information for M PDSCHs) by higher layer signaling. Note that the number M of TCI states configured in the UE may be limited by at least one of the UE capability and the QCL type.

DCI used for PDSCH scheduling may include a predetermined field (which may be referred to as, for example, a TCI field, a TCI state field, or the like) indicating a TCI state for the PDSCH. The DCI may be used for PDSCH scheduling of one cell, and may be referred to as, for example, DL DCI, DL assignment, DCI format 1_0, DCI format 1_1, or the like.

Whether or not the TCI field is included in the DCI may be controlled by information of which the UE is notified from the base station. The information may be information (for example, TCI presence information, in-DCI TCI presence information, a higher layer parameter TCI-PresentIn- DCI) indicating whether the TCI field is present or absent in the DCI. The information may be configured in the UE by, for example, higher layer signaling.

When more than eight types of TCI states are configured in the UE, MAC CE may be used to activate (or specify) eight or less types of TCI states. The MAC CE may be referred to as a TCI states activation/deactivation for UE-specific PDSCH MAC CE. A value of the TCI field in the DCI may indicate one of the TCI states activated by MAC CE.

In a case where the TCI presence information configured as "enabled" is configured in the UE for a CORESET for scheduling a PDSCH (CORESET used for PDCCH transmission for scheduling the PDSCH), the UE may assume that the TCI field is present in the DCI format 1_1 of the PDCCH transmitted on the CORESET.

In a case where the TCI presence information is not configured for the CORESET for scheduling a PDSCH, or the PDSCH is scheduled by the DCI format 1_0, in a case where a time offset between reception of DL DCI (DCI for scheduling the PDSCH) and reception of a PDSCH corresponding to the DCI is greater than or equal to a threshold value, the UE, to determine QCL of a PDSCH antenna port, may assume that a TCI state or a QCL assumption for the PDSCH is the same as a TCI state or a QCL assumption applied to a CORESET used for PDCCH transmission for scheduling the PDSCH.

When the TCI presence information is set to "enabled", the TCI field in the DCI in the component carrier (CC) for scheduling (the PDSCH) indicates the activated TCI state in the scheduled CC or DL BWP, and when the PDSCH is scheduled by DCI format 1_1, the UE may use the TCI with the DCI and according to the value of the TCI field in the detected PDCCH in order to determine the QCL of the PDSCH antenna port. When the time offset between the reception of the DL DCI (scheduling the PDSCH) and the PDSCH corresponding to the DCI (PDSCH scheduled by the DCI) is equal to or greater than the threshold value, the UE may assume that the DM-RS port of the PDSCH of the serving cell is QCL with the RS in the TCI state with respect to the QCL type parameter given by the indicated TCI state.

When a single-slot PDSCH is configured in the UE, the indicated TCI state may be based on the activated TCI state in the slot having the scheduled PDSCH. When a multi-slot PDSCH is configured in the UE, the indicated TCI state may be based on the activated TCI state in the first slot having the scheduled PDSCH, and the UE may expect that it is the same across the slots having the scheduled PDSCH. When the UE is configured with a CORESET associated with a search space set for cross-carrier scheduling, when the TCI presence information is set to "enabled" for the CORESET for the UE and at least one of the TCI states configured for the serving cell scheduled by a search space set includes QCL type D, the UE may assume that the time offset between the detected PDCCH and the PDSCH corresponding to the PDCCH is equal to or greater than the threshold value.

In both a case where in-DCI TCI information (higher layer parameter TCI-PresentInDCI) is set to "enabled" and a case where the in-DCI TCI information is not configured in an RRC connection mode, when a time offset between reception of DL DCI (DCI for scheduling a PDSCH) and a corresponding PDSCH (PDSCH scheduled by the DCI) is less than a threshold value, the UE may assume that the DM-RS port of the PDSCH of the serving cell has a lowest CORESET-ID in a latest slot in which one or more CORE-SETs in an active BWP of the serving cell are monitored by the UE, and is an RS and QCL related to the QCL parameter used for QCL indication of the PDCCH of a CORESET associated with a monitored search space (FIG. 1). This RS may be referred to as a default TCI state of the PDSCH or a default QCL assumption of the PDSCH.

The time offset between the reception of the DL DCI and the reception of the PDSCH corresponding to the DCI may be referred to as a scheduling offset.

Further, the above-mentioned threshold value may be referred to as QCL time duration "timeDurationForQCL", "threshold", "threshold for offset between a DCI indicating a TCI state and PDSCH scheduled by the DCI", "threshold-Sched-Offset", a schedule offset threshold value, a scheduling offset threshold value, or the like.

The QCL time duration may be based on the UE capability, and may be based on, for example, the delay in decoding and beam switching of the PDCCH. The QCL time length may be a minimum time required for the UE to perform PDCCH reception and application of spatial QCL information received in the DCI for PDSCH processing. The QCL time length may be represented by the number of symbols for each subcarrier interval or may be represented by time (for example, µs). Information of the QCL time length may be reported from the UE to the base station as UE capability information, or may be configured from the base station to the UE by using higher layer signaling.

For example, the UE may assume that the DMRS ports of PDSCH are in QCL with the DL-RS based on the TCI state activated for the CORESET corresponding to the lowest CORESET-ID. The latest slot may be, for example, a slot that receives the DCI for scheduling the PDSCH.

Note that the CORESET-ID may be an ID (ID for identifying CORESET) configured by the RRC information element "ControlResourceSet".

<Spatial Relation for PUCCH>

In the UE, a parameter (PUCCH configuration information, PUCCH-Config) used for PUCCH transmission may be configured by higher layer signaling (for example, Radio Resource Control (RRC) signaling). The PUCCH configuration information may be configured for each partial band (for example, an uplink Bandwidth Part (BWP)) in a carrier (also referred to as a cell and a Component Carrier (CC)).

The PUCCH configuration information may include a list of PUCCH resource set information (for example, PUCCH-ResourceSet) and a list of PUCCH spatial relation information (for example, PUCCH-SpatialRelationInfo).

The PUCCH resource set information may include a list (for example, resourceList) of a PUCCH resource index (ID, for example, PUCCH-ResourceId).

Furthermore, when the UE does not have a dedicated PUCCH resource configuration information (for example, a dedicated PUCCH resource configuration) provided by the PUCCH resource set information in the PUCCH configuration information (before RRC setup), the UE may determine a PUCCH resource set on the basis of a parameter (for example, pucch-ResourceCommon) in the system information (for example, System Information Block Type 1 (SIB1) or Remaining Minimum System Information (RMSI)). The PUCCH resource set may include 16 PUCCH resources.

On the other hand, when the UE has the dedicated PUCCH resource configuration information (UE-dedicated uplink control channel configuration, dedicated PUCCH resource configuration) (after RRC setup), the UE may determine the PUCCH resource set according to the number of UCI information bits.

The UE may determine one PUCCH resource (index) in the PUCCH resource set (for example, a cell-specific PUCCH resource set or a PUCCH resource set determined for individual UE) based on at least one of a value of a predetermined field (for example, a PUCCH resource indicator field) in Downlink Control Information (DCI) (for example, the DCI format 1_0 or 1_1 used for PDSCH scheduling), the number of CCEs ($N_{CCE}$) in a control resource set (control resource set (CORESET)) for reception of a PDCCH that carries the DCI, or an index ($n_{CCE,0}$) of a head (first) CCE of the reception of the PDCCH.

The PUCCH spatial relation information (for example, the RRC information element "PUCCH-spatialRelationInfo") may indicate a plurality of candidate beams (spatial domain filters) for PUCCH transmission. The PUCCH spatial relation information may indicate a spatial relation between a reference signal (RS) and a PUCCH.

The list of the PUCCH spatial relation information may include several elements (PUCCH spatial relation information Information Element (IE)). Each piece of the PUCCH spatial relation information may include, for example, at least one of an index (ID, for example, pucch-SpatialRelationInfoId) of the PUCCH spatial relation information, an index (ID, for example, servingCellId) of the serving cell, and information related to the RS (reference RS) that has a spatial relation with the PUCCH.

For example, the information regarding the RS may be an SSB index, a CSI-RS index (for example, an NZP-CSI-RS resource configuration ID), or an SRS resource ID and an ID of the BWP. The SSB index, the CSI-RS index, and the SRS resource ID may be associated with at least one of a beam, a resource, and a port selected by measurement of a corresponding RS.

When more than one piece of the spatial relation information regarding the PUCCH is configured, the UE may perform control so that one piece of the PUCCH spatial relation information is active with respect to one PUCCH resource at a given time, on the basis of a PUCCH spatial relation Activation/Deactivation MAC CE.

The PUCCH spatial relation Activation/Deactivation MAC CE of Rel-15 NR is expressed by a total of three Octets (8 bits x 3=24 bits) of Octets (Octs) 1-3.

The MAC CE may include information such as an application target serving cell ID ("Serving Cell ID" field), a BWP ID ("BWP ID" field), and a PUCCH resource ID ("PUCCH Resource ID" field).

Furthermore, the MAC CE includes a field of "$S_i$," (i=0-7). When a field of a certain $S_i$ indicates 1, the UE activates the spatial relation information of a spatial relation information ID #i. When a field of a certain $S_i$ indicates 0, the UE deactivates the spatial relation information of the spatial relation information ID #i.

The UE may activate PUCCH relation information specified by a MAC CE 3 ms after transmitting an acknowledgment (ACK) for the MAC CE activating predetermined PUCCH spatial relation information.

<Spatial Relation for SRS and PUSCH>

The UE may receive information (SRS configuration information, for example, a parameter in the RRC control element "SRS-Config") used for transmission of a measurement reference signal (for example, a sounding reference signal (SRS)).

Specifically, the UE may receive at least one of information related to one or a plurality of SRS resource sets (SRS resource set information, for example, the RRC control element "SRS-ResourceSet") and information related to one or a plurality of SRS resources (SRS resource information, for example, the RRC control element "SRS-Resource").

One SRS resource set may be associated with a predetermined number of SRS resources (a predetermined number of SRS resources may be grouped). Each SRS resource may be specified by an SRS Resource Indicator (SRI) or an SRS resource Identifier (ID).

The SRS resource set information may include information of an SRS resource set ID (SRS-ResourceSetId), a list of SRS resource IDs (SRS-ResourceId) used in the resource set, an SRS resource type, and usage of the SRS.

Here, the SRS resource type may indicate any of a Periodic SRS (P-SRS), a semi-persistent SRS (SP-SRS), and an Aperiodic SRS (A-SRS, AP-SRS). Note that the UE may transmit a P-SRS and an SP-SRS periodically (or periodically after activated), and transmit an A-SRS based on an SRS request in the DCI.

Furthermore, the usage ("usage" of an RRC parameter and "SRS-SetUse" of L1 (Layer-1) parameter) may be, for example, beam management (beamManagement), codebook-based transmission (codebook: CB), non-codebook-based transmission (nonCodebook: NCB), antenna switching (antennaSwitching), or the like. An SRS used for the codebook-based transmission or the non-codebook-based transmission may be used to determine a precoder for codebook-based or non-codebook-based PUSCH transmission based on an SRI.

For example, in the case of the codebook-based transmission, the UE may determine the precoder for the PUSCH transmission on the basis of the SRI, a Transmitted Rank Indicator (TRI), and a Transmitted Precoding Matrix Indicator (TPMI). For the non-codebook based transmission, the UE may determine a precoder for PUSCH transmission based on the SRI.

The SRS resource information may include an SRS resource ID (SRS-ResourceId), the number of SRS ports, an SRS port number, transmission Comb, SRS resource mapping (for example, time and/or frequency resource position, resource offset, resource periodicity, the number of repetitions, the number of SRS symbols, and SRS bandwidth), hopping related information, an SRS resource type, a sequence ID, and SRS spatial relation information.

The SRS spatial relation information (for example, the RRC information element "spatialRelationInfo") may indicate spatial relation information between a predetermined reference signal and the SRS. The predetermined reference signal may be at least one of a Synchronization Signal/Physical Broadcast Channel (SS/PBCH) block, a Channel State Information Reference Signal (CSI-RS), or an SRS (for example, another SRS). The SS/PBCH block may be referred to as a synchronization signal block (SSB).

The SRS spatial relation information may include at least one of an SSB index, a CSI-RS resource ID, and an SRS resource ID as an index of the predetermined reference signal.

Note that, in the present disclosure, an SSB index, an SSB resource ID, and an SSB resource indicator (SSBRI) may be replaced with each other. Furthermore, a CSI-RS index, a CSI-RS resource ID, and a CSI-RS resource indicator (CRI) may be replaced with each other. Further, an SRS index, an SRS resource ID and an SRI may be replaced with each other.

The SRS spatial relation information may include a serving cell index, a BWP index (BWP ID), and the like corresponding to the predetermined reference signal.

In NR, the transmission of the uplink signal may be controlled based on the presence or absence of beam correspondence (BC). The BC may be, for example, a capability of a certain node (for example, a base station or UE) to determine a beam (transmission beam, Tx beam) used for signal transmission based on a beam (reception beam, Rx beam) used for signal reception.

Note that BC may be referred to as transmission/reception beam correspondence (Tx/Rx beam correspondence), beam reciprocity, beam calibration, calibrated/non-calibrated, reciprocity calibrated/non-calibrated, a correspondence degree, a matching degree, or the like.

For example, when there is no BC, the UE may transmit the uplink signal (for example, PUSCH, PUCCH, SRS, and the like) by using the same beam (spatial domain transmission filter) as the SRS (or the SRS resource) indicated from the base station on the basis of measurement results of one or more SRSs (or SRS resources).

On the other hand, when there is BC, the UE may transmit an uplink signal (for example, PUSCH, PUCCH, SRS, and the like) using a beam (spatial domain transmission filter) identical or corresponding to the beam (spatial domain reception filter) used for reception of a predetermined SSB or CSI-RS (or CSI-RS resource).

When spatial relation information regarding the SSB or CSI-RS and the SRS is configured for a certain SRS resource (for example, when there is BC), the UE may transmit the SRS resource by using the same spatial domain filter (spatial domain transmission filter) as a spatial domain filter (spatial domain reception filter) for receiving the SSB or CSI-RS. In this case, the UE may assume that the UE reception beam of the SSB or CSI-RS is the same as the UE Tx beam of the SRS.

For a certain SRS (target SRS) resource, when spatial relation information regarding another SRS (reference SRS) and the SRS (target SRS) is configured (for example, when there is no BC), the UE may transmit the target SRS resource by using the same spatial domain filter (spatial domain transmission filter) as a spatial domain filter (spatial domain transmission filter) for transmitting the reference SRS. That is, in this case, the UE may assume that a UE transmission beam of the reference SRS is the same as a UE Tx beam of the target SRS.

The UE may determine the spatial relation of the PUSCH scheduled by the DCI based on a value of a predetermined field (for example, SRS resource identifier (SRI) field) in the DCI (for example, DCI format 0_1). Specifically, the UE may use the spatial relation information (for example, the RRC information element "spatialRelationInfo") of the SRS resource determined based on the value (for example, SRI) of the predetermined field for the PUSCH transmission.

When the codebook-based transmission is used for the PUSCH, in the UE, two SRS resources may be configured by RRC, and one of the two SRS resources may be indicated by DCI (1-bit predetermined field). When the non-codebook-based transmission is used for the PUSCH, in the UE, four SRS resources may be configured by RRC, and one of the four SRS resources may be indicated by DCI (2-bit predetermined field). In order to use a spatial relation other than the two or four spatial relations configured by the RRC, RRC reconfiguration is required.

Note that, the DL-RS can be configured for the spatial relation of the SRS resource used for the PUSCH. For example, for the SP-SRS, in the UE, a spatial relation of a plurality of (for example, up to 16) SRS resources can be configured by RRC, and one of the plurality of SRS resources can be indicated by the MAC CE.

(Default Spatial Relation)

If spatial relation information for an individual PUCCH configuration or an individual SRS configuration except an SRS with beam management application (usage='beamManagement') is not configured for UE that supports beam correspondence in a certain frequency range (for example, frequency range (FR)2), a default spatial relation to be applied for the individual PUCCH configuration or the individual SRS configuration may be one of the following options 1 to 5:

(Option 1)

The default spatial relation may be a default TCI state of the PDSCH or a default QCL assumption of the PDSCH. For example, the default TCI state for the PDSCH may be the TCI state or a QCL assumption for the PDSCH corresponding to the most recent (most recent, latest) slot and lowest CORESET ID.

(Option 2)

The default spatial relation may be one of the active TCI states of the CORESET.

(Option 3)

When the UL signal is scheduled or triggered by the PDCCH (DL DCI) for scheduling the PDSCH, the default spatial relation for the UL signal may be the TCI state of the PDCCH (the TCI state to be used to receive the PDCCH). Otherwise, the default spatial relation for the UL signal may be a default TCI state of the PDSCH or a default QCL assumption of the PDSCH. The UL signal scheduled or triggered by the PDCCH for scheduling the PDSCH may be an A-SRS triggered by the PDCCH or may be a PUCCH carrying a HARQ-ACK for the PDSCH scheduled by the PDCCH.

(Option 4)

The default spatial relation may be a QCL assumption of CORESET #0.

(Option 5)

The default spatial relation may be a pathloss reference RS.

If spatial relation information for an individual PUCCH configuration or an individual SRS configuration except an SRS with beam management application is not configured for UE that does not support beam correspondence in a certain frequency range (for example, FR2), a default spatial relation may be applied for the individual PUCCH configuration or the individual SRS configuration.

The UE does not know whether or not the DCI schedules the PDSCH until decoding of the DCI is completed. Thus, when the foregoing option 3 is used, the UE cannot determine the default spatial relation during a DCI decoding period as the TCI state of the PDCCH carrying the DCI.

When the foregoing option 3 is used, there is a case where the QCL assumption of the PDSCH is different from the default spatial relation, and thus, UE operation becomes complicated. For example, UE that supports only one beam for the UL and the DL cannot support this case.

(Overlapping of a Plurality of DL Signals Having Different QCL Parameters)

In a case where the default TCI state is applied to the PDSCH, if a PDSCH DMRS overlaps a PDCCH DMRS in at least one symbol, and the QCL type D (RS of the QCL type D) of the PDSCH DMRS is different from the QCL type D (RS of the QCL type D) of the PDCCH DMRS, the UE expects to prioritize reception of the PDCCH associated with the CORESET to be used for the default TCI state. This is also applied to intra-band CA cases (when the PDSCH and the CORESET are in different component carriers (CCs)).

There may be a case where the PDSCH and the CSI-RS or the SSB that do not have a QCL-D relation (relationship) with each other (not QCL-D and having an RS of a different QCL type D) are scheduled even for UE having a single active TCI state.

Example 1

For UE with a single active TCI state, it is also assumed that a NW configures a plurality of periodic (P)-TRS (for example, 64 P-TRSs) resources (for example, 64 P-TRS resources) for the UE. In this event, it is assumed that the NW transmits the plurality of P-TRSs. It is conceivable that one of the TRSs overlaps with a PDSCH that is not in a QCL-D relation with each other. The UE reception operation in this event is not defined in Rel. 15.

Example 2

Also for UE with a single active TCI state, a plurality of resources of the CSI-RS or the SSB for beam measurement (for example, L1-RSRP reporting) can be configured. It is conceivable that one of the CSI-RS or the SSB overlaps with the PDSCH that is not in the QCL-D relation with each other. The UE reception operation in this event is not defined in Rel. 15.

In a case where the default TCI state is applied to the PDSCH, if the PDSCH DMRS overlaps the CSI-RS in at least one symbol and the QCL type D of the PDSCH DMRS is different from the QCL type D of the CSI-RS, the reception or measurement operation by the UE is not clear. The CSI-RS may be any of a periodic CSI-RS (periodic (P)-CSI-RS), semi-persistent (semi-persistent (SP-CSI-RS), and an aperiodic CSI-RS (aperiodic (A)-CSI-RS) scheduled (triggered) by a PDCCH with an offset equal to or greater than an A-CSI-RS beam switching timing threshold (beamSwitchTiming, {4 symbols, 28 symbols, 48 symbols}) reported by the UE. The A-CSI-RS beam switching timing threshold is a minimum period between the DCI that triggers the A-CSI-RS and A-CSI-RS transmission, and is the number of symbols counted from a last symbol of the DCI to a first symbol of the A-CSI-RS.

As described above, if the UE cannot appropriately determine the QCL parameter of the UL signal or the DL signal, degradation of system performance such as decrease in throughput may occur.

The present inventors therefore have conceived a method for appropriately determining a QCL parameter.

Hereinafter, embodiments according to the present disclosure will be described in detail with reference to the drawings. A radio communication method according to each embodiment may be applied independently, or may be applied in combination with others.

In the present disclosure, spatial relation, spatial relation information, spatial relation assumption, spatial domain transmission filter, UE spatial domain transmission filter, spatial domain filter, UE transmission beam, UL Tx beam, RS in spatial relation, DL-RS, QCL assumption, SRI, spatial relation based on SRI, and UL TCI may be replaced with each other.

A TCI state, a TCI state or a QCL assumption, a QCL assumption, a spatial domain reception filter, a UE spatial domain reception filter, a spatial domain filter, a UE reception beam, a DL reception beam, and a DL-RS may be replaced with each other. The RS of QCL type D, the DL-RS associated with QCL type D, the DL-RS with QCL type D, a source of the DL-RS, the SSB, and the CSI-RS may be replaced with each other.

In the present disclosure, the TCI state may be information (for example, a DL-RS, a QCL type, a cell in which a DL-RS is transmitted, or the like) about a reception beam (spatial domain reception filter) indicated (configured) for the UE. The QCL assumption is based on transmission or reception of an associated signal (for example, PRACH), and may be information (for example, a DL-RS, a QCL type, a cell in which a DL-RS is transmitted, or the like) about a reception beam (spatial domain reception filter) assumed by the UE.

In the present disclosure, a cell, a CC, a carrier, a BWP, and a band may be interchangeable.

In the present disclosure, an index, an ID, an indicator, and a resource ID may be interchangeable.

In the present disclosure, the specific UL transmission, the specific UL channel, the specific UL signal, the specific uplink signal, the specific type of UL transmission, the PUSCH, the PUCCH, and the SRS may be interchangeable.

In the present disclosure, the specific DL transmission, the specific DL channel, the specific DL signal, the specific downlink signal, the specific type of DL transmission, the PDSCH, the PDCCH, the CORESET, the DL-RS, the SSB, and the CSI-RS may be interchangeable.

In the present disclosure, the "UE performs specific UL transmission according to a default spatial relation", the "UE uses a default spatial relation for spatial relation of specific UL transmission", the "UE assumes (regards) that the spatial relation of the specific UL transmission is the same as the RS of the default spatial relation", and the "UE assumes (regards) that the spatial relation of the specific UL transmission is the same as the RS of the QCL type D of the default spatial relation" may be interchangeable.

In the present disclosure, the default spatial relation, the default spatial relation assumption, the TCI state or the QCL assumption of the specific DL transmission, the RS regarding the QCL parameter given by the TCI state or the QCL assumption of the specific DL transmission, the RS of the QCL type D in the TCI state or the QCL assumption of the specific DL transmission, the spatial relation of the reference UL transmission, the specific RS, the specific DL RS, and the first reference signal may be interchangeable.

In the present disclosure, the latest slot and the most recent slot may be interchangeable.

In the present disclosure, the TRS, the tracking CSI-RS, the CSI-RS having the TRS information (higher layer parameter trs-Info), and the NZP-CSI-RS resource in the NZP-CSI-RS resource set having the TRS information may be interchangeable.

(Radio Communication Method)

The UE may receive a DCI that schedules or triggers a specific signal and may use different QCL parameters (TCI state or QCL assumption or spatial relation) for the specific signal between a case where the specific signal is started within a first period for decoding the DCI and a case where the specific signal is started within a second period after the first period. The specific signal, the specific DL signal, the specific UL signal, the PDSCH, the PUCCH, the A-SRS, the CSI-RS that temporally overlaps the PDSCH, and the PDSCH that temporally overlaps the CSI-RS may be interchangeable.

Embodiment 1

The UE may determine a QCL assumption or a spatial relation of the specific signal on the basis of a timing of the specific signal.

The UE may determine the QCL assumption or the spatial relation on the basis of a time from the DCI reception to the specific signal and a DCI decoding time. The DCI decoding time may be a time required for the UE to decode the DCI, or may be one of UE processing times. The DCI decoding time may be expressed by the number of symbols per subcarrier interval or may be expressed by a period (for example, μs). The DCI decoding time may be expressed by UE capability i by a number i of the UE capability including the DCI decoding time. The DCI decoding time, the DCI decoding time duration, the DCI decoding timing, the DCI decoding timing for beam, the DCI decoding timing for QCL, the PDCCH processing time, the PDCCH processing time of the capability i, and the CORESET time length may be interchangeable.

The DCI decoding time may be specified in the specifications, may be configured in the UE by higher layer signaling or may be reported by the UE by UE capability information. The UE may configure the DCI decoding time based on the UE capability information by higher layer signaling.

The UE may determine the QCL assumption or the spatial relation on the basis of the time from the DCI reception to the specific signal, the DCI decoding time, and the QCL time length.

Figure 2:
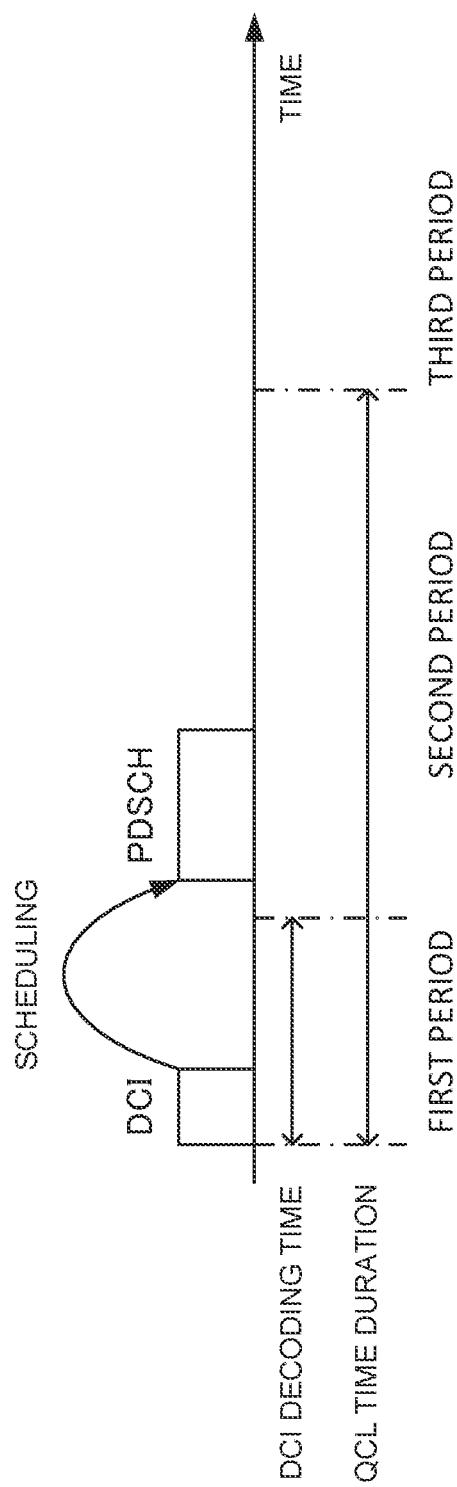
FIG. 2 is a diagrams illustrating an example of a QCL assumption of a PDSCH.

As illustrated in FIG. 2, at least one of the first period, the second period, and the third period may be defined.

The first period may be a period from DCI reception to elapse of the DCI decoding time, or may be a period in which the UE decodes the DCI, or may be a period from DCI reception by the UE to completion of decoding, or may be a period in which the UE monitors PDCCH candidates or may be a period of a CORESET. Start of the first period may be start of the PDCCH (PDCCH candidate) (for example, a start symbol), end of the PDCCH (PDCCH candidate) (for example, an end symbol), start of the CORESET (for example, a start symbol) or end of the CORESET (for example, an end symbol). End of the first period may be end of the PDCCH (PDCCH candidate) (for example, an end symbol) or end of the CORESET (for example, an end symbol). The DCI reception, the start of the DCI (start symbol), and the end of the DCI (end symbol) may be interchangeable.

The second period may be a period from a time point at which the first period (DCI decoding by the UE) ends to a time point when a specific processing time (time length, threshold) has elapsed from the DCI reception. The specific processing time may be a QCL time length for the PDSCH or may be a specific processing time for the specific UL signal. The specific processing time may be a minimum time required for the UE to perform PDCCH reception and application of spatial QCL information received in the DCI. The specific processing time may be expressed by the number of symbols per subcarrier interval or may be expressed by a period (for example, μs). Information of the specific processing time may be reported from the UE to the base station as UE capability information, or may be configured from the base station to the UE by using higher layer signaling.

The third period may be a period after a time point at which the second period ends.

Start of the specific signal within a certain period (for example, one of the first period, the second period and the third period) and the first symbol of the specific signal being within a certain period may be interchangeable.

The UE may report UE capability information indicating that it supports operation of Embodiment 1. If the UE reports that it supports the operation of Embodiment 1, or if the operation of Embodiment 1 is configured on the basis of the UE capability information, the UE may perform the operation of Embodiment 1; otherwise, may determine a TCI state or a QCL assumption or a spatial relation on the basis of Rel. 15.

Embodiment 1-1

[QCL Assumption of PDSCH]

The definition of the QCL assumption of the PDSCH may be different from the definition of the QCL assumption of the PDSCH in Rel. 15. The QCL assumption of the PDSCH may be different depending on the timing of the PDSCH. For example, the QCL assumption of the PDSCH may be different between a case where the PDSCH is started within the first period and a case where the PDSCH is started within the second period. The UE may determine the QCL assumption of the PDSCH on the basis of the timing of the PDSCH.

The QCL assumption or the TCI state of the DMRS of the PDSCH scheduled by the DCI may be different depending on whether the PDSCH is in the first period, the second period or the third period.

The QCL assumption of the PDSCH started within the first period may be a specific QCL assumption (RS of type A or RS of type D). The specific QCL assumption may be the TCI state of the CORESET with the lowest CORESET ID in the latest slot or the TCI state of the CORESET with the lowest CORESET ID.

As illustrated in FIG. 2, the QCL assumption of the PDSCH started within the second period may be a TCI state (RS of type A or RS of type D) of the DCI (PDCCH) that schedules the PDSCH.

The QCL assumption of the PDSCH started within the third period may be a TCI state (RS of type A or RS of type D) indicated by a specific field (for example, a TCI field) in the DCI that schedules the PDSCH.

[UL Signal Scheduled or Triggered by DL DCI]

The specific UL signal may be a UL signal scheduled or triggered by a DL DCI (PDCCH for scheduling the PDSCH). For example, the specific UL signal may be an A-SRS triggered by the DL DCI or may be a PUCCH carrying a HARQ-ACK for the PDSCH scheduled by the DL DCI.

The default spatial relation of the specific UL signal scheduled or triggered by the DL DCI may be a QCL assumption of the PDSCH scheduled by the DL DCI.

The spatial relation of the specific UL signal started within the first period may be a specific QCL assumption (RS of type A or RS of type D). The specific QCL assumption may be the TCI state of the CORESET with the lowest CORESET ID in the latest slot or the TCI state of the CORESET with the lowest CORESET ID.

Figure 3:
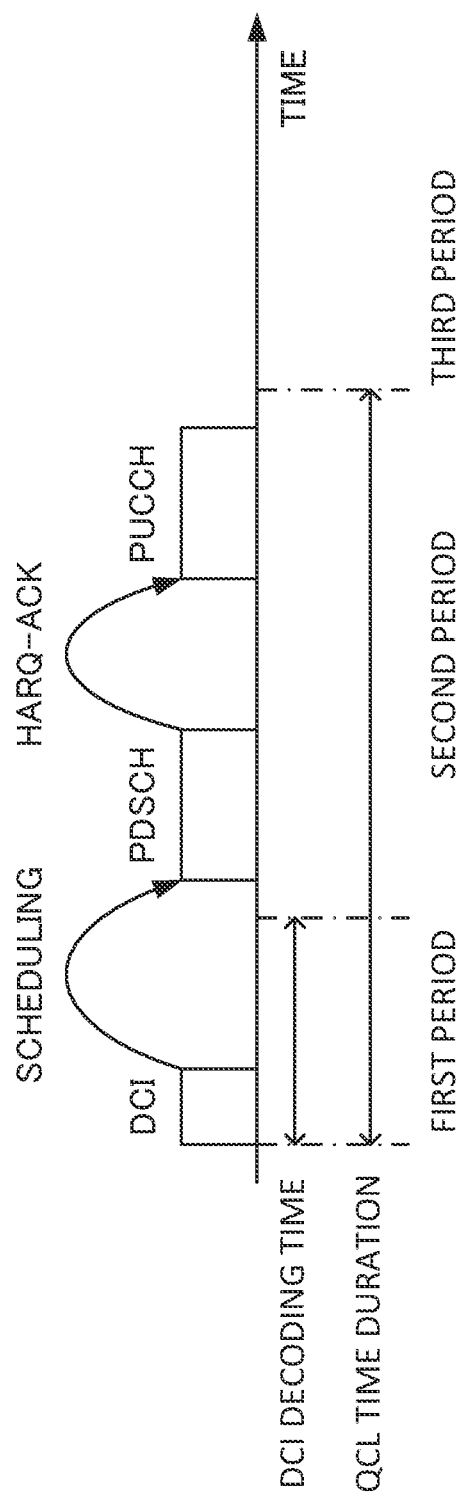
FIG. 3 is a diagram illustrating an example of a default spatial relation of a PUCCH.
Figure 4:
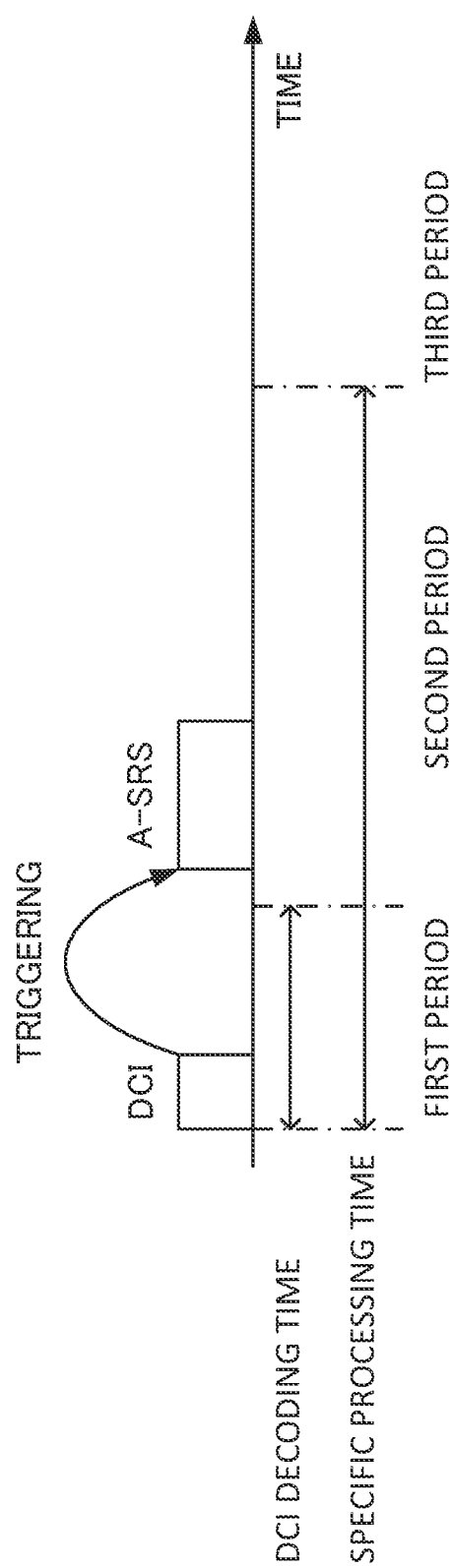
FIG. 4 is a diagram illustrating an example of a default spatial relation of an A-SRS.

The spatial relation of the specific UL signal started within the second period may be a TCI state (RS of type A or RS of type D) of the DCI (PDCCH) that schedules or triggers the specific UL signal. As illustrated in FIG. 3, when the specific UL signal is a PUCCH scheduled by the DCI, the specific processing time may be a QCL time length for the PDSCH. As illustrated in FIG. 4, when the specific UL signal is the A-SRS triggered by the DCI, the specific processing time may be the specific processing time for the A-SRS.

The spatial relation of the specific UL signal started within the third period may be a TCI state (RS of type A or RS of type D) indicated by a specific field (for example, a TCI field) in the DCI that schedules or triggers the specific UL signal.

Embodiment 1-2

The default spatial relation of the specific UL signal may be different depending on the timing of the specific UL signal.

The spatial relation of the specific UL signal started within the first period may be a specific QCL assumption (RS of type A or RS of type D). The specific QCL assumption may be the TCI state of the CORESET with the lowest CORESET ID in the latest slot or the TCI state of the CORESET with the lowest CORESET ID.

The spatial relation of the specific UL signal started within the second period may be a TCI state (RS of type A or RS of type D) of the DCI (PDCCH) that schedules or triggers the specific UL signal.

The spatial relation of the specific UL signal started within the third period may be any one of the following spatial relation 1 or 2.

[[Spatial Relation 1]]

The spatial relation of the specific UL signal started within the third period may be, same as the spatial relation of the specific UL signal started within the second period, a TCI state (RS of type A or RS of type D) of the DCI (PDCCH) that schedules or triggers the specific UL signal.

[[Spatial Relation 2]]

The spatial relation of the specific UL signal started within the third period may be a TCI state (RS of type A or RS of type D) indicated by a specific field (for example, a TCI field) in the DCI that schedules or triggers the specific UL signal.

[UL Signal Scheduled or Triggered by DL DCI]

The specific UL signal may be a UL signal scheduled or triggered by a DL DCI (PDCCH for scheduling the PDSCH).

[PUSCH Scheduled by DCI Format 0_0]

The specific UL signal may be a PUSCH scheduled by a DCI format 0_0. For example, the specific UL signal may be a PUSCH on the cell scheduled by the DCI format 0_0 when a PUCCH resource (for example, dedicated PUCCH resource) having a spatial relation (for example, an active spatial relation) is not configured in the active UL BWP of the cell.

The DCI format 0_0 and the DCI format not including at least one of the SRI, the indication of the spatial relation, and the carrier indicator field (CIF) may be interchangeable.

According to this embodiment, even when the spatial relation is not configured for the UL signal, the UE can appropriately determine the spatial relation.

Embodiment 2

If the following application condition is satisfied, the UE may apply the default spatial relation to the specific UL signal.

The application condition may include at least one of: no spatial relation information for the specific UL signal is configured, the specific UL signal is within a frequency range (for example, frequency range (FR)2), the specific UL signal is not an SRS with beam management application (usage='beamManagement'), the specific UL signal is not an SRS with non-codebook-based transmission application (usage='nonCodebook') with an associated CSI-RS (associatedCSI-RS) configuration, and the UE supports beam correspondence. The spatial relation information for the specific UL signal may be spatial relation information in the individual PUCCH configuration or the individual SRS configuration. The associated CSI-RS may be an ID (index) of a CSI-RS resource associated with the SRS resource set in the non-codebook-based transmission.

The application condition may include that only one TCI state is active for the PDCCH (the number of active TCI states for the PDCCH is 1). According to this application condition, UE operation is simplified.

The application condition may include that only one TCI state is active for the PDCCH and the PDSCH (the number of active TCI states for the PDCCH and the PDSCH is 1). The UE operation is simplified when a single active beam is used for the UL and the DL.

The application condition may include that the PDCCH and the PUCCH scheduled by the PDCCH are in the same BWP or the same CC (cross-carrier scheduling is not used). In a case of cross-carrier scheduling, the UE is not always able to apply the same beam to the PDCCH and PUCCH, and thus, by excluding cross-carrier scheduling, the UE operation is simplified. For example, in a case of inter-band carrier aggregation (CA), it is conceivable that different beams are applied to the PDCCH and the PUCCH. In addition, for example, in a case of FR1-FR2 CA, it is conceivable that the UE cannot determine the beam when the DCI is in FR1, and the PUCCH, the SRS, or the PUSCH is in FR2.

The application condition may include that the inter-band CA is not used.

According to this embodiment, it is possible to simplify beam control. Further, it is possible to reduce overhead of MAC CE for activation or deactivation of the TCI state or the spatial relation. In addition, it is possible to avoid complicated processing (for example, complicated processing for the case that is not used) from being implemented in the UE.

Embodiment 3

In the following target case, the UE may determine processing on the basis of a time from DCI reception. The target case may be a case where the PDSCH overlaps the specific DL signal in at least one symbol, and the RS of the QCL type D of the PDSCH is different from the RS of the QCL type D of the specific DL signal. In the target case, the UE may receive at least one of the specific DL signal and the PDSCH using the RS of the QCL type D of at least one of the specific DL signal and the PDSCH.

In the present disclosure, overlapping of a DL signal a and a DL signal b, simultaneous reception of the DL signal a and the DL signal b, and overlapping of the DL signal a and the DL signal b in the time resource may be interchangeable. Further, while in this embodiment, simultaneous reception of the PDSCH and the specific DL signal will be described, this embodiment may also be applied to simultaneous reception of the PDCCH and the specific DL signal in a similar manner. In other words, in the present disclosure, the PDSCH and the PDCCH may be interchangeable.

The specific signal may be a specific DL signal that temporally overlaps the PDSCH (simultaneously with the PDSCH) or may be a PDSCH that temporally overlaps the specific DL signal (simultaneously with the specific DL signal).

In the target case, a symbol in which the PDSCH overlaps the specific DL signal may be referred to as an overlapping symbol. In the target case, symbols that are not overlapping symbols may be referred to as non-overlapping symbols.

The specific DL signal may be any of CSI-RS, TRS, and SSB. Hereinafter, while a case where the specific DL signal is the CSI-RS will be described, the CSI-RS may be read as another specific DL signal.

Figure 5:
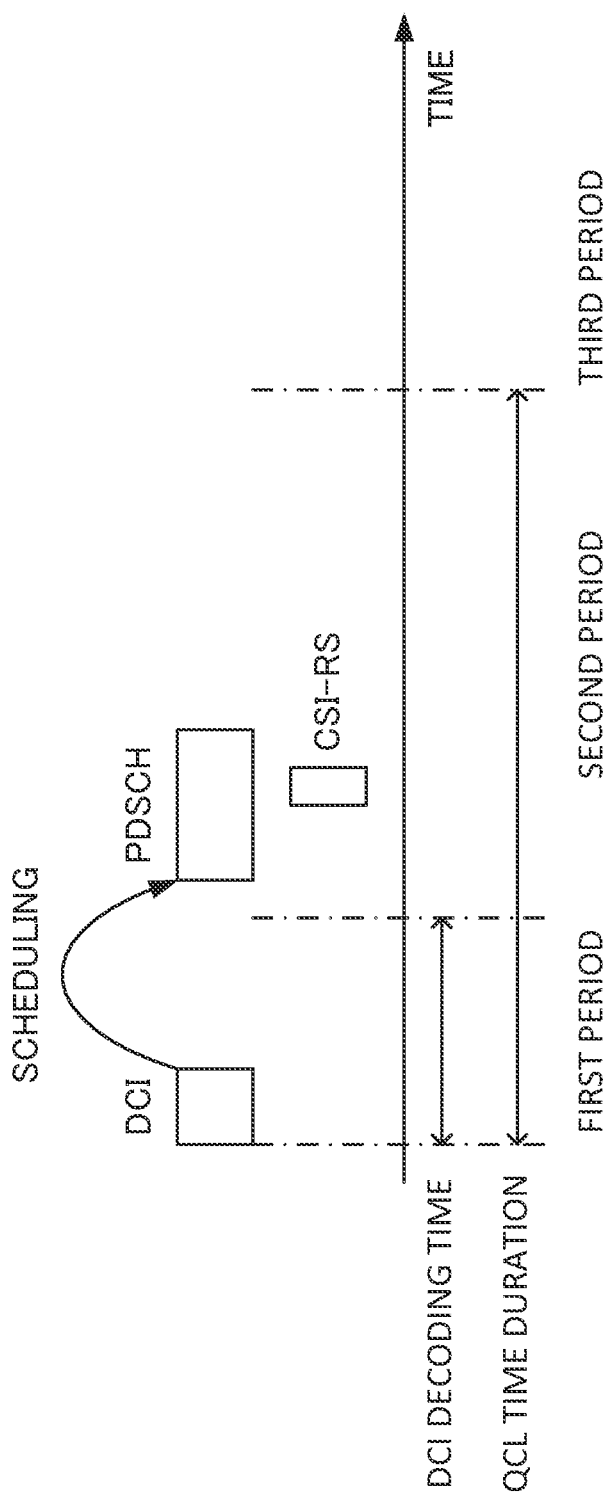
FIG. 5 is a diagram illustrating an example of overlap between the PDSCH and a CSI-RS.

The UE may determine processing on the basis of the timing of the overlapping symbol in the target case. Hereinafter, the UE operation when the overlapping symbol in the target case is started within each of the first period, the second period, and the third period (FIG. 5) will be described.

<<First Period>>

In the target case, if the overlapping symbol is started within the first period, the UE may prioritize reception of the CSI-RS. For example, in the target case, if the overlapping symbol is started within the first period, the UE may receive the CSI-RS or may receive at least one of the PDSCH or the CSI-RS by using the RS of the QCL type D in the CSI-RS. For example, in the target case, if the overlapping symbol is started within the first period, the UE may perform one of the following reception processing 1 and 2.

[Reception Processing 1]

In overlapping symbols, the UE may measure the CSI-RS using the RS of the QCL type D of the CSI-RS and does not have to receive (demodulate, decode) the PDSCH. The UE may assume that the PDSCH is punctured or dropped or rate matched in overlapping symbols and may demodulate and decode the PDSCH using the RS of the QCL type D of the PDSCH in non-overlapping symbols.

When a coding rate of the PDSCH is lower than a certain value (equal to or lower than a certain value), the reception processing 1 may be used.

Figure 6:
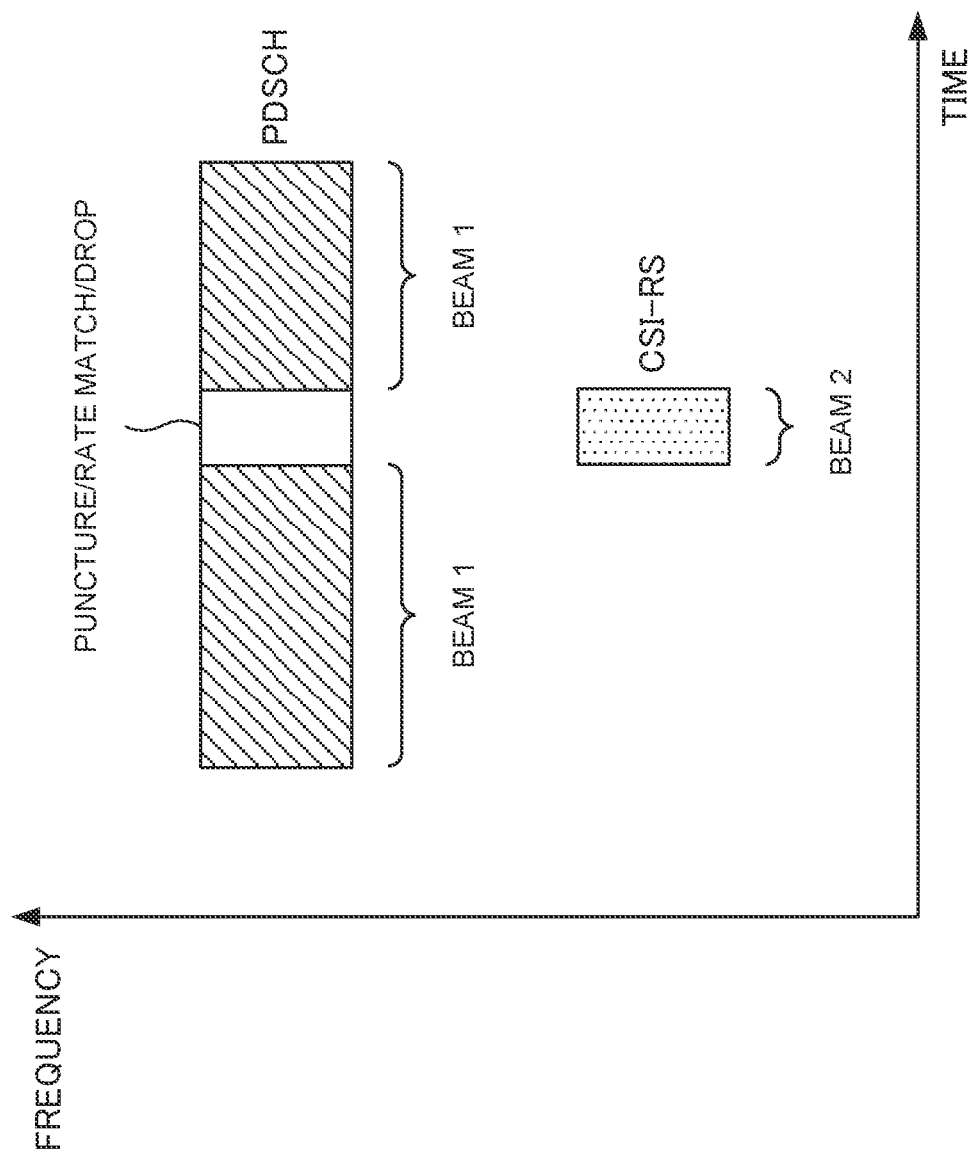
FIG. 6 is a view illustrating an example of reception processing 1.

For example, FIG. 6 illustrates a case where the CSI-RS overlaps some symbols of the PDSCH, the RS of the QCL type D of the PDSCH corresponds to a beam 1, and the RS of the QCL type D of the CSI-RS corresponds to a beam 2. In this example, the UE punctures, drops, or rate matches the PDSCH in the overlapping symbols and receives the PDSCH in the non-overlapping symbols using the beam 1. In this example, the UE receives the CSI-RS in the overlapping symbols using the beam 2.

[Reception Processing 2]

In the overlapping symbols, the UE may receive the PDSCH using the RS of the QCL type D of the CSI-RS. In the non-overlapping symbols, the UE may receive the PDSCH using the RS of the QCL type D of the PDSCH.

Figure 7:
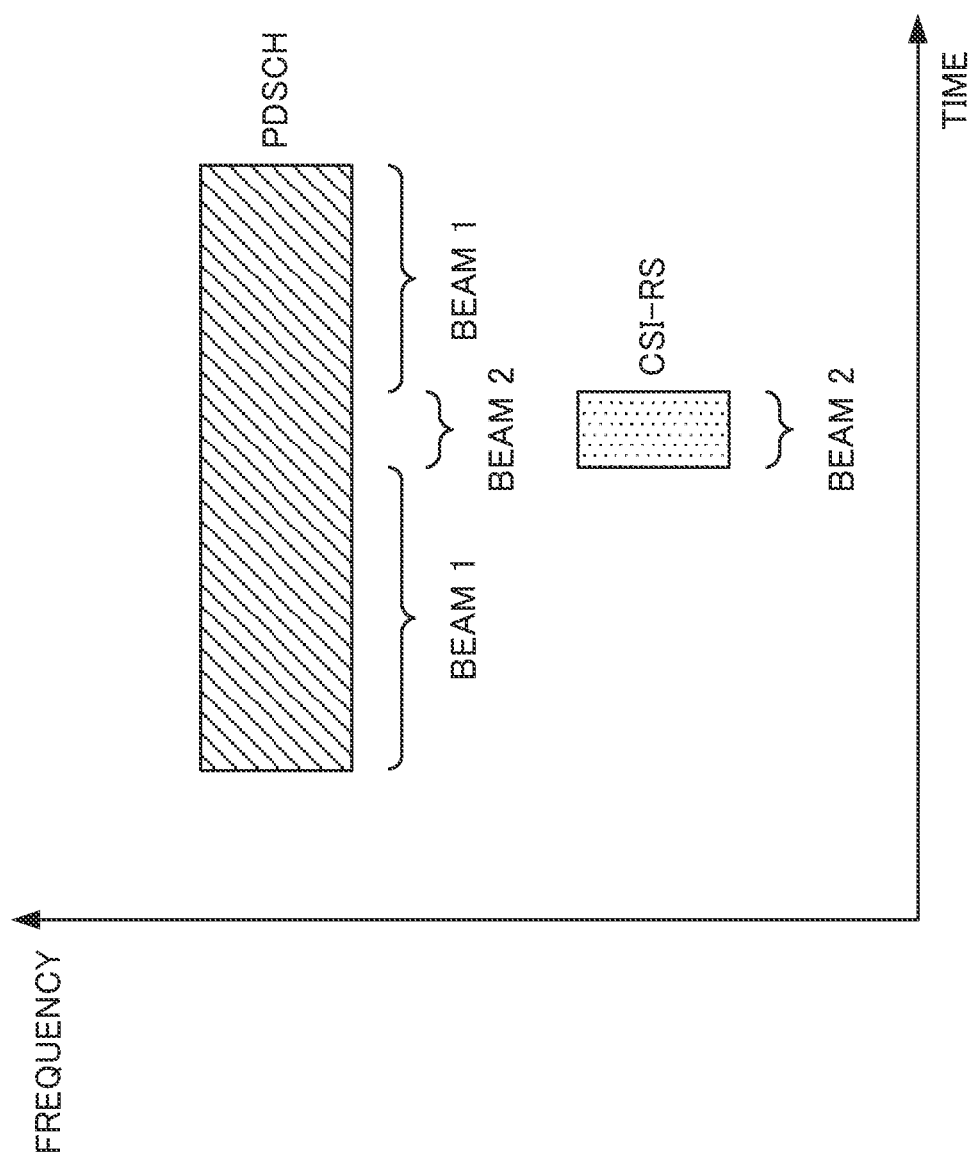
FIG. 7 is a view illustrating an example of reception processing 2.

For example, FIG. 7 illustrates a case where the CSI-RS overlaps some symbols of the PDSCH, the RS of the QCL type D of the PDSCH corresponds to a beam 1, and the RS of the QCL type D of the CSI-RS corresponds to a beam 2. In this example, the UE receives the PDSCH in the non-overlapping symbols using the beam 1 and receives the PDSCH in the overlapping symbols using the beam 2. In this example, the UE receives the CSI-RS in the overlapping symbols using the beam 2.

<<Second Period or Third Period>>

In the target case, if the overlapping symbol is started within the second period (FIG. 5) or the third period, the UE may prioritize reception of the PDSCH. For example, in the target case, if the overlapping symbol is started within the second period or the third period, the UE may receive the PDSCH or may receive at least one of the PDSCH or the CSI-RS by using the RS of the QCL type D of the PDSCH.

For example, in the overlapping symbols, the UE may receive (demodulate, decode) the PDSCH using the RS of the QCL type D of the PDSCH and does not have to measure the CSI-RS. The UE may assume that the CSI-RS is punctured or dropped in the overlapping symbols and measure the CSI-RS in the non-overlapping symbols using the RS of the QCL type D of the CSI-RS.

For example, in the overlapping symbols, the UE may measure the CSI-RS using the RS of the QCL type D of the PDSCH. In the non-overlapping symbols, the UE may receive the CSI-RS using the RS of the QCL type D of the CSI-RS.

According to this embodiment, when the PDSCH overlaps the specific DL signal in the time resource, reception or measurement can be performed using an appropriate TCI state or QCL assumption.

(Radio Communication System)

Hereinafter, a configuration of a radio communication system according to one embodiment of the present disclosure will be described. In this radio communication system, communication is performed using any one of the radio communication methods according to the embodiments of the present disclosure or a combination thereof.

Figure 8:
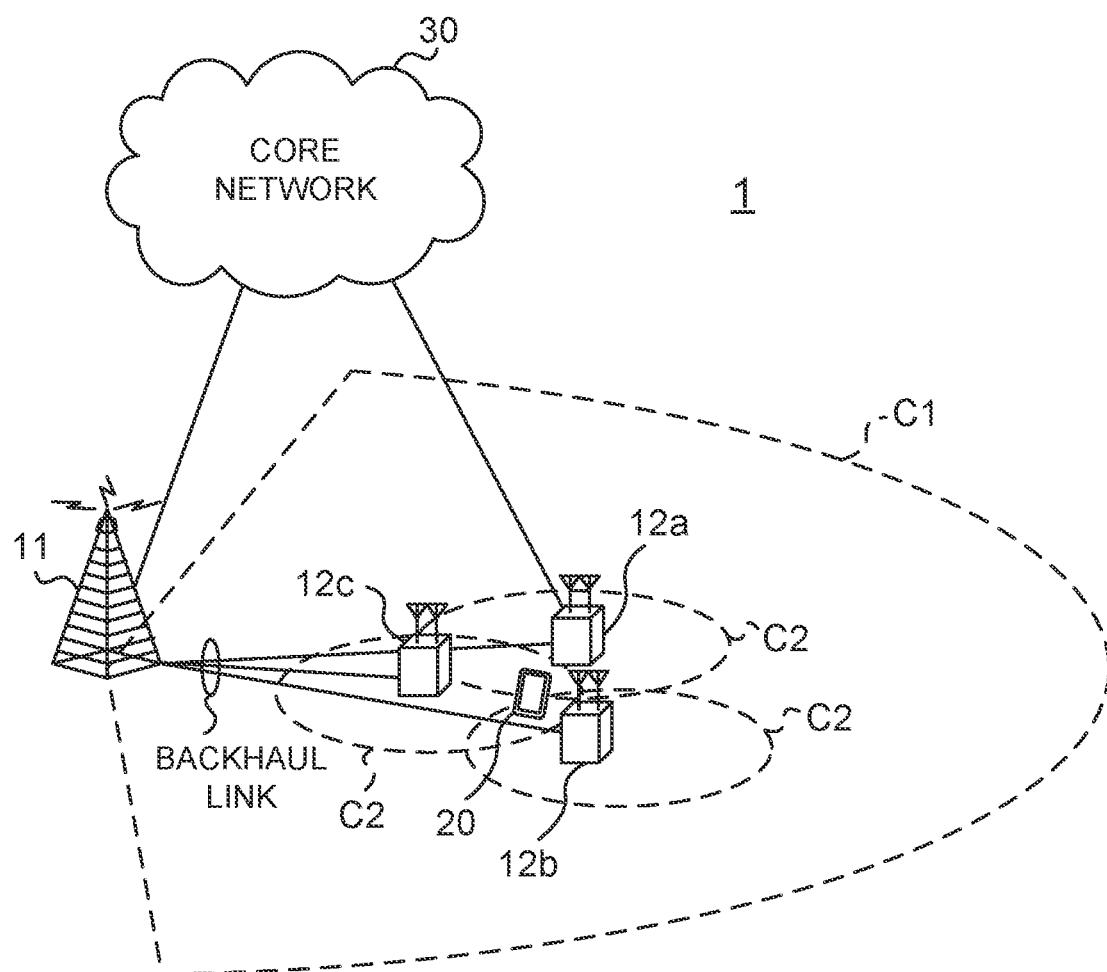
FIG. 8 is a diagram illustrating an example of a schematic configuration of a radio communication system according to an embodiment.

FIG. 8 is a diagram illustrating an example of a schematic configuration of a radio communication system according to an embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In EN-DC, an LTE (E-UTRA) base station (eNB) is a master node (MN), and an NR base station (gNB) is a secondary node (SN). In NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNBs) (NR-NR dual connectivity (NN-DC)).

The radio communication system 1 may include a base station 11 that forms a macro cell C1 with a relatively wide coverage, and base stations 12 (12a to 12c) that are arranged in the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as base stations 10 when the base stations 11 and 12 are not distinguished.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency range 1 (FR1) and a second frequency range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of FR1 and FR2 are not limited to these, and for example, FR1 may be a frequency range higher than FR2.

Further, the user terminal 20 may perform communication on each CC using at least one of time division duplex (TDD) or frequency division duplex (FDD).

The plurality of base stations 10 may be connected by wire (for example, an optical fiber or an X2 interface in compliance with common public radio interface (CPRI)) or by radio (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

A base station 10 may be connected to a core network 30 via another base station 10 or directly. The core network 30 may include, for example, at least one of evolved packet core (EPC), 5G core network (5GCN), next generation core (NGC), and the like.

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that, in the radio communication system 1, another radio access method (for example, another single carrier transmission method and another multi-carrier transmission method) may be used as UL and DL radio access methods.

In the radio communication system 1, as a downlink channel, a downlink shared channel (a physical downlink shared channel (PDSCH)) shared by each user terminal 20, a broadcast channel (a physical broadcast channel (PBCH)), a downlink control channel (a physical downlink control channel (PDCCH)), or the like may be used.

In the radio communication system 1, an uplink shared channel (physical uplink shared channel (PUSCH)) shared by each user terminal 20, an uplink control channel (physical uplink control channel (PUCCH)), a random access channel (physical random access channel (PRACH)), and the like may be used as uplink channels.

User data, higher layer control information, and a system information block (SIB) and the like are transmitted by the PDSCH. The PUSCH may transmit user data, higher layer control information, and the like. Further, the PBCH may transmit a master information block (MIB).

Lower layer control information may be transmitted by PDCCH. The lower layer control information may include, for example, downlink control information (DCI) including scheduling information of at least one of the PDSCH and the PUSCH.

Note that, the DCI for scheduling the PDSCH may be referred to as DL assignment, DL DCI, and the like, and the DCI for scheduling the PUSCH may be referred to as UL grant, UL DCI, and the like. Note that PDSCH may be replaced with DL data, and PUSCH may be replaced with UL data.

A control resource set (CORESET) and a search space may be used to detect the PDCCH. The CORESET corresponds to a resource that searches for DCI. The search space corresponds to a search area and a search method for PDCCH candidates. One CORESET may be associated with one or a plurality of search spaces. The UE may monitor CORESET associated with a certain search space on the basis of search space configuration.

One search space may correspond to a PDCCH candidate corresponding to one or a plurality of aggregation levels. One or a plurality of search spaces may be referred to as a search space set. Note that "search space", "search space set", "search space configuration", "search space set configuration", "CORESET", "CORESET configuration", and the like in the present disclosure may be interchangeable.

Uplink control information (UCI) including at least one of channel state information (CSI), delivery confirmation information (which may be referred to as, for example, hybrid automatic repeat request acknowledgement (HARQ-ACK), ACK/NACK, or the like), scheduling request (SR), or the like may be transmitted on the PUCCH. A random access preamble for establishing a connection with a cell may be transmitted on PRACH.

Note that in the present disclosure, downlink, uplink, and the like may be expressed without "link". Furthermore, various channels may be expressed without "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as the DL-RS.

The synchronization signal may be at least one of, for example, a primary synchronization signal (PSS) and a secondary synchronization signal (SSS). A signal block including the SS (PSS, SSS) and the PBCH (and the DMRS for the PBCH) may be referred to as an SS/PBCH block, an SS block (SSB), and the like. Note that the SS, the SSB, or the like may also be referred to as a reference signal.

In the radio communication system 1, a sounding reference signal (SRS), a demodulation reference signal (DMRS), and the like may be transmitted as an uplink reference signal (UL-RS). Note that, DMRSs may be referred to as "user terminal-specific reference signals (UE-specific Reference Signals)."

(Base Station)

Figure 9:
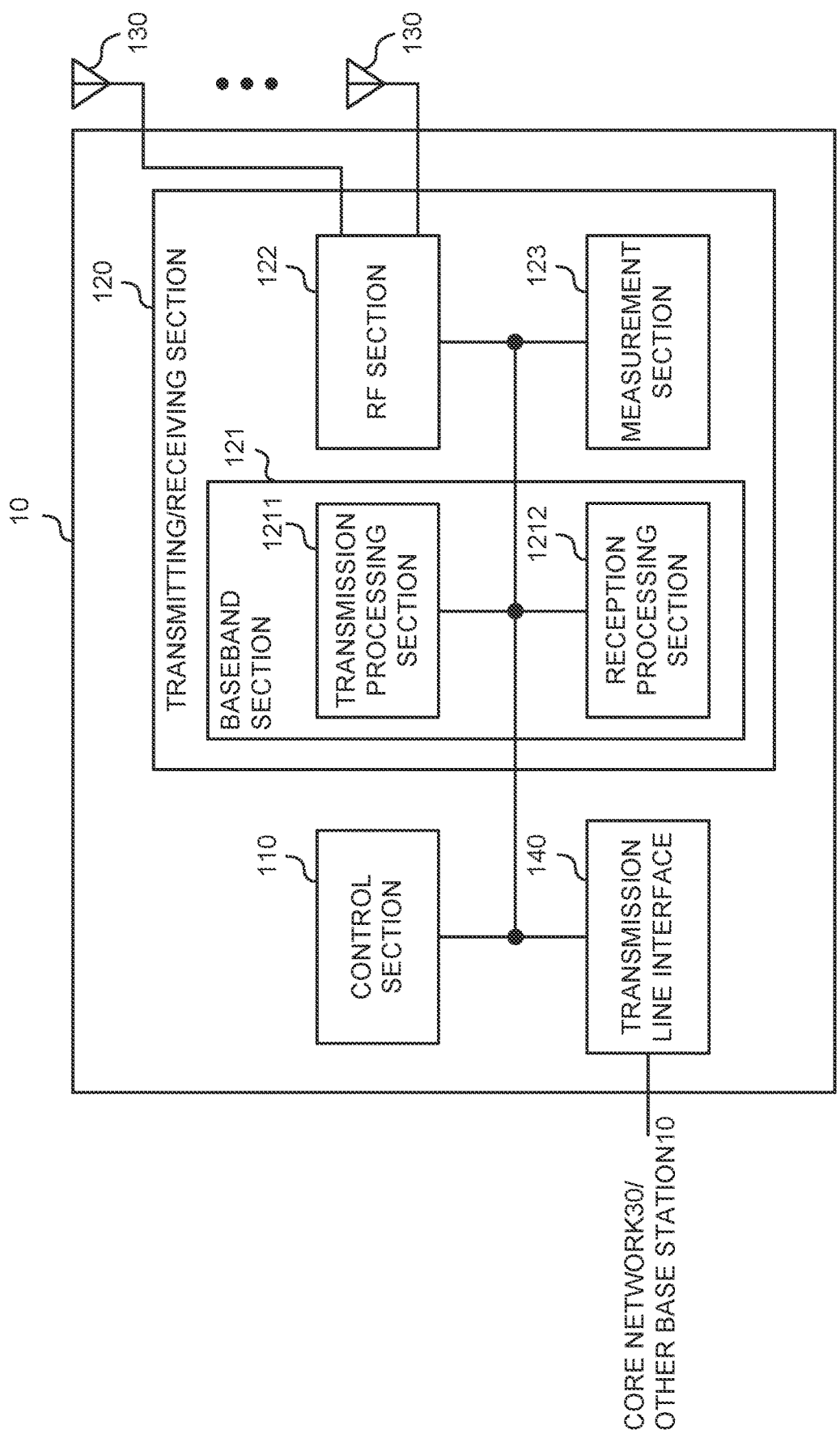
FIG. 9 is a diagram illustrating an example of a configuration of a base station according to one embodiment.

FIG. 9 is a diagram illustrating an example of a configuration of a base station according to one embodiment. The base station 10 includes a control section 110, a transmitting/receiving section 120, a transmission/reception antenna 130, and a transmission line interface 140. Note that one or more of the control sections 110, one or more of the transmitting/receiving sections 120, one or more of the transmission/reception antennas 130, and one or more of the transmission line interfaces 140 may be provided.

Note that, although this example will primarily illustrate functional blocks that pertain to characteristic parts of the present embodiment, it may be assumed that the base station 10 has other functional blocks that are necessary for radio communication as well. A part of processing of each section described below may be omitted.

The control section 110 controls the entire base station 10. The control section 110 can include a controller, a control circuit, or the like, which is described on the basis of common recognition in the technical field to which the present disclosure relates.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be forwarded as a signal, control information, a sequence, and the like, and may transfer the data, the control information, the sequence, and the like to the transmitting/receiving section 120. The control section 110 may perform call processing (such as configuration or release) of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can be implemented by a transmitter/receiver, an RF circuit, a baseband circuit, a filter, a phase shifter, a measurement circuit, a transmission/reception circuit, and the like, which are described on the basis of common recognition in the technical field related to the present disclosure.

The transmitting/receiving section 120 may be configured as an integrated transmitting/receiving section, or may include a transmission section and a receiving section. The transmission section may be configured by the transmission processing section 1211 and the RF section 122. The receiving section may include the reception processing section 1212, the RF section 122, and the measurement section 123.

The transmission/reception antenna 130 can be implemented by an antenna described on the basis of common recognition in the technical field related to the present disclosure, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a Tx beam and a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, for example, on data or control information acquired from the control section 110 to generate a bit string to be transmitted.

The transmitting/receiving section 120 (transmission processing section 1211) may perform transmission processing such as channel encoding (which may include error correcting encoding), modulation, mapping, filtering processing, discrete Fourier transform (DFT) processing (if necessary), inverse fast Fourier transform (IFFT) processing, precoding, or digital-analog transform on the bit string to be transmitted, and may output a base band signal.

The transmitting/receiving section 120 (RF section 122) may perform modulation to a radio frequency range, filtering processing, amplification, and the like on the base band signal, to transmit a signal in the radio frequency range via the transmission/reception antenna 130.

Meanwhile, the transmitting/receiving section 120 (RF section 122) may perform amplification, filtering processing, demodulation to a base band signal, and the like on the signal in the radio frequency band received by the transmission/reception antenna 130.

The transmitting/receiving section 120 (reception processing section 1212) may apply reception processing such as analog-digital transform, fast Fourier transform (FFT) processing, inverse discrete Fourier transform (IDFT) processing (if necessary), filtering processing, demapping, demodulation, decoding (which may include error correction decoding), MAC layer processing, RLC layer processing, and PDCP layer processing on the acquired base band signal to acquire user data and the like.

The transmitting/receiving section 120 (measurement section 123) may perform measurement on the received signal. For example, the measurement section 123 may perform radio resource management (RRM) measurement, channel state information (CSI) measurement, and the like on the basis of the received signal. The measurement section 123 may measure received power (for example, reference signal received power (RSRP)), received quality (for example, reference signal received quality (RSRQ), a signal to interference plus noise ratio (SINR), or a signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, other base stations 10, and the like, and may acquire, transmit, and the like user data (user plane data), control plane data, and the like for the user terminal 20.

Note that the transmission section and the receiving section of the base station 10 in the present disclosure may include at least one of the transmitting/receiving section 120, the transmission/reception antenna 130, and the transmission line interface 140.

(User Terminal)

Figure 10:
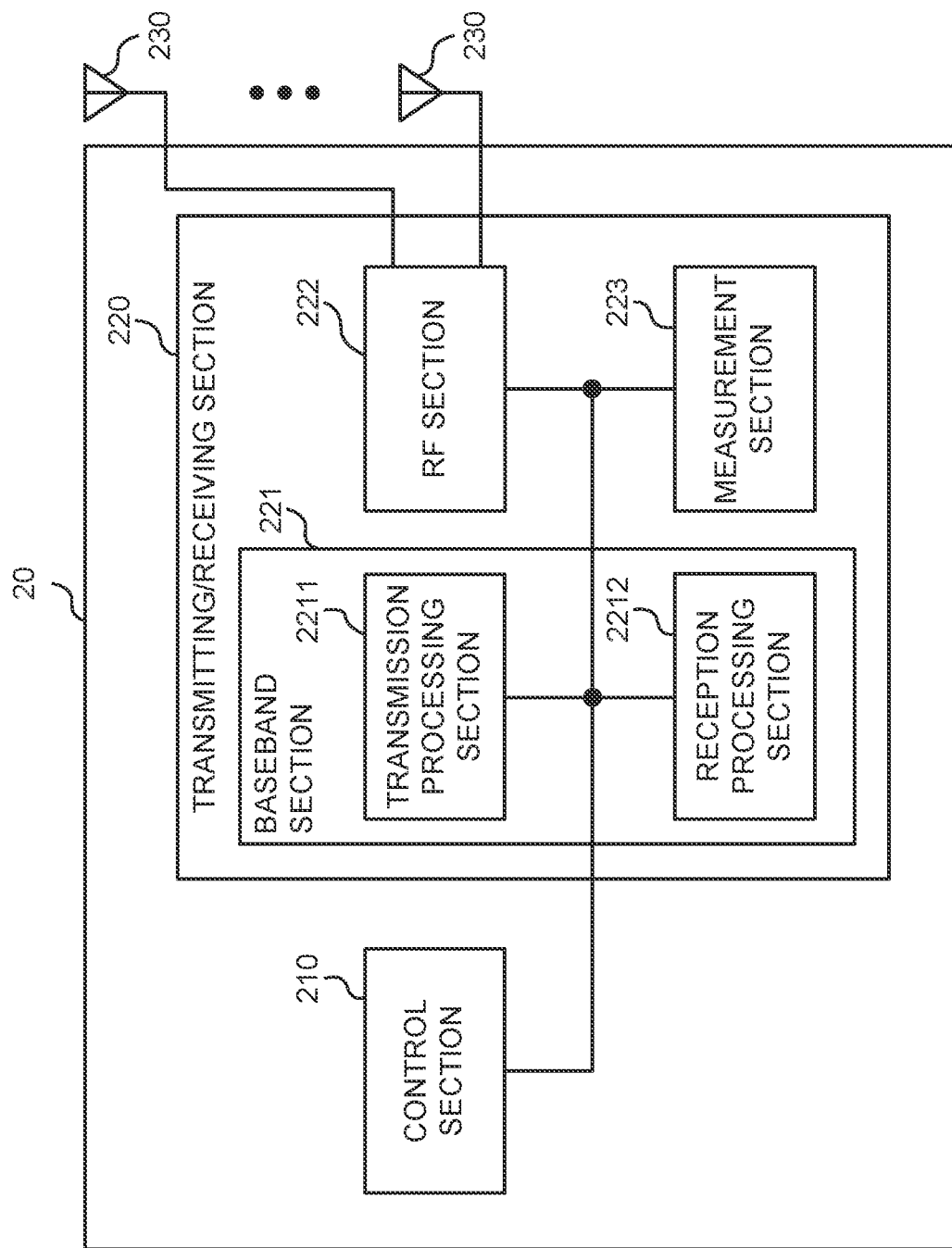
FIG. 10 is a diagram illustrating an example of a configuration of a user terminal according to one embodiment.

FIG. 10 is a diagram illustrating an example of a configuration of a user terminal according to one embodiment. The user terminal 20 includes a control section 210, a transmitting/receiving section 220, and a transmission/reception antenna 230. Note that one or more each of the control sections 210, the transmitting/receiving sections 220, and the transmission/reception antennas 230 may be included.

Note that this example mainly describes functional blocks of characteristic parts of the present embodiment, and it may be assumed that the user terminal 20 also includes other functional blocks necessary for radio communication. A part of processing of each section described below may be omitted.

The control section 210 controls the entire user terminal 20. The control section 210 can include a controller, a control circuit, and the like that are described on the basis of common recognition in the technical field related to the present disclosure.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmission/reception circuit, and the like that are described on the basis of common recognition in the technical field related to the present disclosure.

The transmitting/receiving section 220 may be formed as an integrated transmitting/receiving section, or may include a transmission section and a receiving section. The transmission section may be configured by the transmission processing section 2211 and the RF section 222. The receiving section may include the reception processing section 2212, the RF section 222, and the measurement section 223.

The transmission/reception antenna 230 can include an antenna described on the basis of common recognition in the technical field related to the present disclosure, for example, an array antenna or the like.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a Tx beam and a reception beam by using digital beam forming (for example, precoding), analog beam forming (for example, phase rotation), or the like.

The transmitting/receiving section 220 (transmission processing section 2211) may perform PDCP layer processing, RLC layer processing (for example, RLC retransmission control), MAC layer processing (for example, HARQ retransmission control), and the like, for example, on data, control information, and the like acquired from the control section 210, to generate a bit string to be transmitted.

The transmitting/receiving section 220 (transmission processing section 2211) may perform transmission processing such as channel encoding (which may include error correcting encoding), modulation, mapping, filtering processing, DFT processing (if necessary), IFFT processing, precoding, or digital-analog conversion on the bit string to be transmitted, to output a baseband signal.

Note that whether or not to apply DFT processing may be determined on the basis of configuration of transform precoding. In a case where transform precoding is enabled for a channel (for example, PUSCH), the transmitting/receiving section 220 (transmission processing section 2211) may perform DFT processing as the transmission processing in order to transmit the channel using a DFT-s-OFDM waveform. In a case where it is not the case, DFT processing need not be performed as the transmission processing.

The transmitting/receiving section 220 (RF section 222) may perform modulation to a radio frequency range, filtering processing, amplification, and the like on the baseband signal, to transmit a signal in the radio frequency range via the transmission/reception antenna 230.

Meanwhile, the transmitting/receiving section 220 (RF section 222) may perform amplification, filtering processing, demodulation to a baseband signal, and the like on the signal in the radio frequency range received by the transmission/reception antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 220 (measurement section 223) may perform measurement on the received signal. For example, the measurement section 223 may perform RRM measurement, CSI measurement, and the like on the basis of the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmission section and the receiving section of the user terminal 20 in the present disclosure may include at least one of the transmitting/receiving section 220 and the transmission/reception antenna 230.

The transmitting/receiving section 220 may receive the downlink control information that schedules or triggers a specific signal. The control section 210 may use different quasi-co-location (QCL) parameters for the specific signal between a case where the specific signal is started within a first period for decoding the downlink control information and a case where the specific signal is started within a second period after the first period.

A sum of a length of the first period and a length of the second period may be a time required for applying a QCL parameter included in the downlink control information.

When the specific signal is started within the second period, the control section 210 may use a transmission control indication (TCI) state used for reception of the downlink control signal for a QCL parameter of the specific signal.

The specific signal may be any of a physical downlink shared channel (PDSCH), a physical uplink control channel (PUCCH), an aperiodic sounding reference signal (A-SRS), a channel state information reference signal (CSI-RS) that temporally overlaps a PDSCH, and a PDSCH that temporally overlaps a CSI-RS.

When at least one of the following is satisfied: only one TCI state is active for a physical downlink control channel (PDCCH); only one TCI state is active for a PDCCH and a PDSCH; the downlink control information and the specific signal are in a same bandwidth part or a same component carrier; and inter-band carrier aggregation is not used, the control section may use the QCL parameter for the specific signal.

(Hardware Configuration)

Note that the block diagrams that have been used to describe the above embodiments illustrate blocks in functional units. These functional blocks (configuration units) may be implemented in arbitrary combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (using wire, radio, or the like, for example) and using these apparatuses. The functional block may be implemented by combining the above-described single apparatus or the above-described plurality of apparatuses with software.

Here, the function includes, but is not limited to, deciding, determining, judging, calculating, computing, processing, deriving, investigating, searching, ascertaining, receiving, transmitting, outputting, accessing, solving, selecting, choosing, establishing, comparing, assuming, expecting, considering, broadcasting, notifying, communicating, forwarding, configuring, reconfiguring, allocating, mapping, assigning, and the like. For example, a functional block (configuration unit) that causes transmission to function may be referred to as a transmitting unit, a transmitter, and the like. In any case, as described above, the implementation method is not particularly limited.

Figure 11:
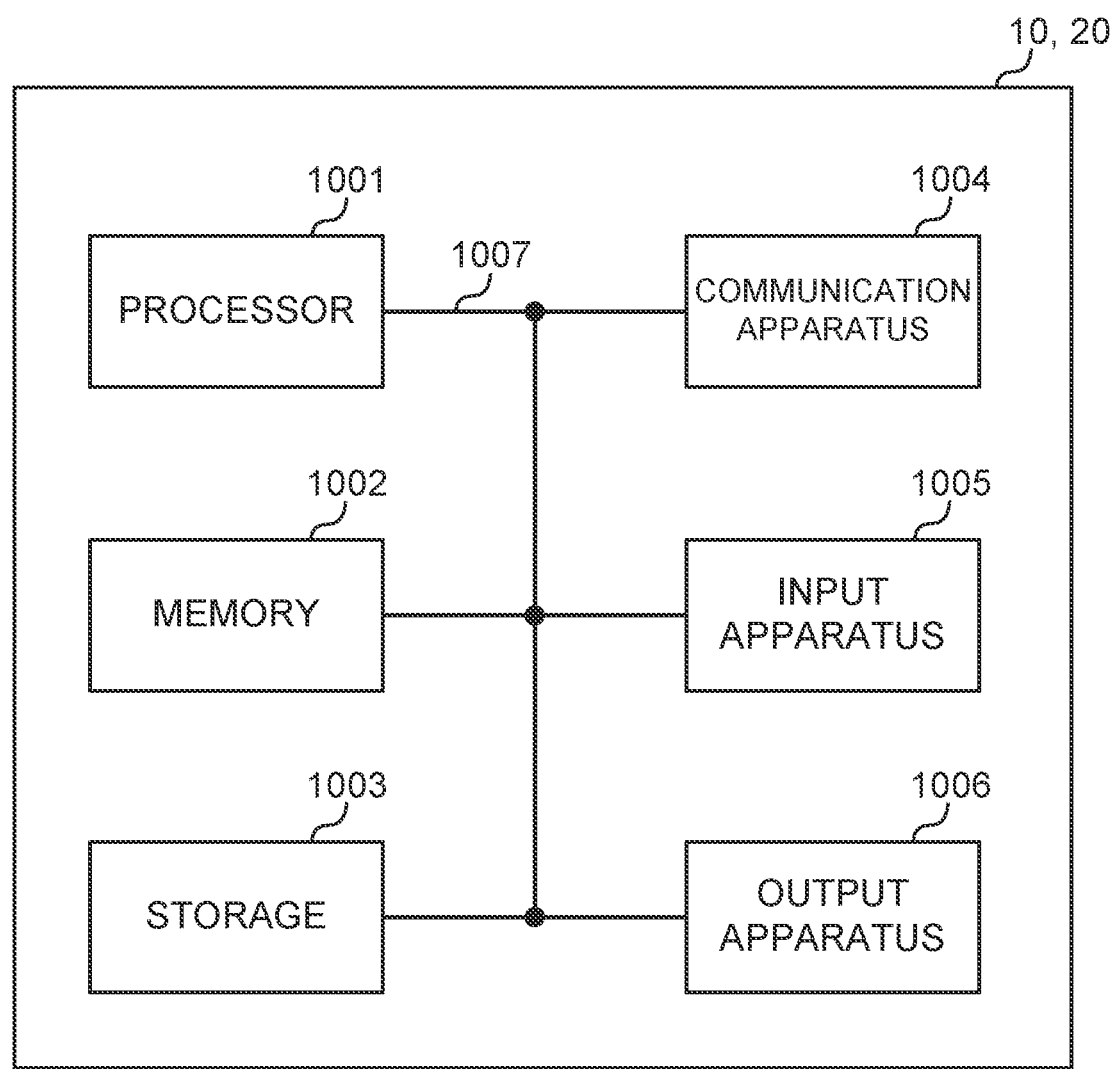
FIG. 11 is a diagram illustrating an example of a hardware configuration of a base station and the user terminal according to one embodiment.

For example, the base station, the user terminal, and the like in one embodiment of the present disclosure may function as a computer that performs the processing of the radio communication method of the present disclosure. FIG. 11 is a diagram illustrating an example of a hardware configuration of the base station and the user terminal according to one embodiment. The above-described base station 10 and user terminal 20 may be physically configured as a computer apparatus including a processor 1001, a memory 1002, a storage 1003, a communication apparatus 1004, an input apparatus 1005, an output apparatus 1006, a bus 1007, and the like.

Note that, in the present disclosure, the terms such as an apparatus, a circuit, a device, a section, and a unit can be replaced with each other. The base station 10 and the user terminal 20 may have hardware configuration including one or a plurality of apparatuses illustrated in the figure, or may be configured without including some apparatuses.

For example, although only one processor 1001 is illustrated, a plurality of processors may be provided. Further, the processing may be executed by one processor, or the processing may be executed in sequence or using other different methods by two or more processors. Note that the processor 1001 may be implemented with one or more chips.

For example, each of functions of the base station 10 and the user terminal 20 is implemented by causing the processor 1001 to perform operation by predetermined software (program) to be read on hardware such as the processor 1001 and the memory 1002, and then controlling communication via the communication apparatus 1004 and controlling at least one of reading and writing of data in the memory 1002 and the storage 1003.

The processor 1001 controls the entire computer by, for example, operating an operating system. The processor 1001 may be configured by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

The processor 1001 reads a program (program code), a software module, data, and the like from at least one of the storage 1003 and the communication apparatus 1004 to the memory 1002, and executes various pieces of processing in accordance therewith. As the program, a program to cause a computer to execute at least a part of the operation described in the above-described embodiment is used. For example, the control section 110 (210) may be implemented by a control program that is stored in the memory 1002 and operates in the processor 1001, and other functional blocks may be implemented similarly.

The memory 1002 is a computer-readable recording medium, and may include at least one of, for example, a read only memory (ROM), an erasable programmable ROM (EPROM), an electrically EPROM (EEPROM), a random access memory (RAM) and other appropriate storage media. The memory 1002 may be referred to as a register, a cache, a main memory (primary storage apparatus), and the like. The memory 1002 can store a program (program code) executable for implementing the radio communication method according to one embodiment of the present disclosure, a software module, and the like.

The storage 1003 is a computer-readable recording medium, and may include at least one of, for example, a flexible disk, a floppy (registered trademark) disk, a magneto-optical disk (e.g., compact disc (e.g., compact disc ROM (CD-ROM), digital versatile disc, and Blu-ray (registered trademark) disk), a removable disk, a hard disk drive, a smart card, a flash memory device (e.g., card, stick, and key drive), a magnetic stripe, a database, a server, and other appropriate storage media. The storage 1003 may be referred to as an auxiliary storage apparatus.

The communication apparatus 1004 is hardware (transmission/reception device) for performing inter-computer communication via at least one of a wired network and a wireless network, and is referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) and time division duplex (TDD). For example, the transmitting/receiving section 120 (220), the transmission/reception antenna 130 (230), and the like described above may be implemented by the communication apparatus 1004. The transmitting/receiving section 120 (220) may be implemented in a physically or logically separated manner by a transmitting unit 120a (220a) and a receiving unit 120b (220b).

The input apparatus 1005 is an input device for receiving input from the outside (e.g., keyboard, mouse, microphone, switch, button, and sensor). The output apparatus 1006 is an output device that performs output to the outside (for example, a display, a speaker, a light emitting diode (LED) lamp, and the like). Note that the input apparatus 1005 and the output apparatus 1006 may be provided in an integrated configuration (e.g., touch panel).

The apparatuses such as the processor 1001 and the memory 1002 are connected by the bus 1007 for communicating information. The bus 1007 may include a single bus, or include buses different for each apparatus.

The base station 10 and the user terminal 20 may include hardware such as a microprocessor, a digital signal processor (DSP), an application specific integrated circuit (ASIC), a programmable logic device (PLD), and a field programmable gate array (FPGA), and some or all of the functional blocks may be implemented by the hardware. For example, the processor 1001 may be implemented by using at least one of these pieces of hardware.

(Variations)

Note that terms described in the present disclosure and terms necessary for understanding the present disclosure may be replaced with terms that have the same or similar meanings. For example, a channel, a symbol, and a signal (signal or signaling) may be interchangeable. Further, the signal may be a message. The reference signal can be abbreviated as an RS, and may be referred to as a pilot, a pilot signal, and the like, depending on which standard applies. The component carrier (CC) may be referred to as a cell, a frequency carrier, a carrier frequency, and the like.

A radio frame may include one or a plurality of periods (frames) in a time domain. Each of the one or plurality of periods (frames) included in the radio frame may be referred to as a subframe. Further, the subframe may include one or a plurality of slots in the time domain. The subframe may be a fixed time length (e.g., 1 ms) that does not depend on numerology.

Here, the numerology may be a communication parameter applied to at least one of transmission and reception of a certain signal or channel. The numerology may indicate at least one of, for example, a subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, and specific windowing processing performed by the transceiver in a time domain.

The slot may include one or a plurality of symbols in the time domain (e.g., orthogonal frequency division multiplexing (OFDM) symbol and single carrier frequency division multiple access (SC-FDMA) symbols). The slot may be a time unit based on the numerology.

The slot may include a plurality of mini slots. Each mini slot may include one or a plurality of symbols in the time domain. Further, the mini slot may be referred to as a sub slot. Each mini slot may include fewer symbols than a slot. PDSCH (or PUSCH) transmitted in a time unit larger than a mini slot may be referred to as PDSCH (PUSCH) mapping type A. A PDSCH (or PUSCH) transmitted by using a mini slot may be referred to as a PDSCH (PUSCH) mapping type B.

All of a radio frame, a subframe, a slot, a mini slot, and a symbol represent a time unit in signal transmission. The radio frame, the subframe, the slot, the mini slot, and the symbol may be called by other applicable names, respectively. Note that time units such as a frame, a subframe, a slot, a mini slot, and a symbol in the present disclosure may be interchangeable.

For example, one subframe may be referred to as a TTI. A plurality of sequential subframes may be referred to as a TTI. One slot or one mini slot may be referred to as a TTI. That is, at least one of the subframe and TTI may be a subframe (1 ms) in the existing LTE, may be a period shorter than 1 ms (for example, one to thirteen symbols), or may be a period longer than 1 ms. Note that a unit to represent the TTI may be referred to as a slot, a mini slot, and the like, instead of a subframe.

Here, a TTI refers to the minimum time unit of scheduling in radio communication, for example. For example, in the LTE system, a base station performs scheduling to allocate radio resources (a frequency bandwidth and transmission power that can be used in each user terminal and the like) to each user terminal in TTI units. Note that the definition of a TTI is not limited thereto.

The TTI may be a transmission time unit of a channel-encoded data packet (transport block), a code block, a codeword, and the like, or may be a processing unit of scheduling, link adaptation, and the like. Note that, when a TTI is given, a time interval (e.g., symbol number) to which the transport block, the code block, the codeword, and the like are actually mapped may be shorter than the TTI.

Note that, when one slot or one mini slot is referred to as a TTI, one or more TTIs (i.e., one or more slots or one or more mini slots) may be the minimum time unit of scheduling. The number of slots (the number of mini slots) constituting the minimum time unit of scheduling may be controlled.

A TTI having a time length of 1 ms may be referred to as a usual TTI (TTI in 3GPP Rel. 8-12), a normal TTI, a long TTI, a usual subframe, a normal subframe, a long subframe, a slot, and the like. A TTI shorter than the usual TTI may be referred to as a shortened TTI, a short TTI, a partial TTI (or fractional TTI), a shortened subframe, a short subframe, a mini slot, a sub slot, a slot, and the like.

Note that the long TTI (e.g., usual TTI and subframe) may be replaced with a TTI having a time length exceeding 1 ms, and a short TTI (e.g., shortened TTI) may be replaced with a TTI having a TTI length less than the TTI length of the long TTI and not less than 1 ms.

A resource block (RB) is a resource allocation unit in a time domain and a frequency domain, and may include one or a plurality of sequential subcarriers in the frequency domain. The number of subcarriers included in the RB may be the same regardless of the numerology, and may be twelve, for example. The number of subcarriers included in the RB may be determined based on the numerology.

The RB may include one or a plurality of symbols in the time domain, and may have a length of one slot, one mini slot, one subframe, or one TTI. Each of one TTI, one subframe, and the like may include one or a plurality of resource blocks.

Note that one or a plurality of RBs may be referred to as physical resource blocks (physical RBs (PRBs)), a sub-carrier group (SCG), a resource element group (REG), a PRB pair, an RB pair, or the like.

The resource block may include one or a plurality of resource elements (REs). For example, one RE may be a radio resource field of one subcarrier and one symbol.

A bandwidth part (BWP) (which may be referred to as partial bandwidth or the like) may represent a subset of sequential common resource blocks (RBs) for a certain numerology in a certain carrier. Here, the common RB may be specified by the index of the RB based on a common reference point of the carrier. The PRB may be defined by a certain BWP, and numbered in the BWP.

The BWP may include a BWP for UL (UL BWP) and a BWP for DL (DL BWP). One or a plurality of BWPs may be configured for UE in one carrier.

At least one of the configured BWPs may be active. The UE is not required to transmit/receive a predetermined signal/channel outside the active BWP. Note that the "cell", the "carrier", and the like in the present disclosure may be replaced with the "BWP".

Note that the structures of the above-described radio frame, subframe, slot, mini slot, symbol, and the like are merely examples. For example, the configurations of the number of subframes included in a radio frame, the number of slots per subframe or radio frame, the number of mini slots included in a slot, the number of symbols and RBs included in a slot or a mini slot, the number of subcarriers included in an RB, the symbol number in a TTI, the symbol length, the cyclic prefix (CP) length, and the like can be variously changed.

The information, parameters, and the like described in the present disclosure may be represented by using absolute values, relative values from predetermined values, or other corresponding information. For example, radio resources may be indicated by a predetermined index.

The names used for parameters and the like in the present disclosure are in no respect limiting. Further, any mathematical expression or the like that uses these parameters may differ from those explicitly disclosed in the present disclosure. Since various channels (e.g., PUCCH and PDCCH) and information elements can be identified by any suitable names, various names assigned to these various channels and information elements are in no respect limiting.

The information, signals, and the like described in the present disclosure may be represented by using any of various different technologies. For example, data, instructions, commands, information, signals, bits, symbols and chips which can be referenced throughout the above entire description may be represented by voltages, currents, electromagnetic waves, magnetic fields, magnetic particles, optical fields, photons, or any combination thereof.

The information, signals, and the like can be output in at least one of a direction from a higher layer to a lower layer and a direction from a lower layer to a higher layer. The information, signals, and the like may be input/output via a plurality of network nodes.

The information, signals, and the like that have been input/output may be stored in a specific location (e.g., memory), or may be managed by using a management table. The information, signal, and the like to be input and output can be overwritten, updated or appended. The output information, signal, and the like may be deleted. The information, signals, and the like that have been input/output may be transmitted to another apparatus.

Notification of information may be performed not only in the aspects/embodiments described in the present disclosure but by using another method. For example, notification of information in the present disclosure may be performed by using physical layer signaling (e.g., downlink control information (DCI) and uplink control information (UCI)), higher layer signaling (e.g., radio resource control (RRC) signaling, broadcast information (e.g., master information block (MIB), and system information block (SIB)), medium access control (MAC) signaling), another signal, or a combination thereof.

Note that the physical layer signaling may be referred to as layer 1/layer 2 (L1/L2) control information (L1/L2 control signal), L1 control information (L1 control signal), or the like. Further, the RRC signaling may be referred to as an RRC message, and may be, for example, an RRC connection setup message, an RRC connection reconfiguration message, and the like. Notification of the MAC signaling may be performed by using, for example, a MAC control element (MAC control element (CE)).

Notification of predetermined information (e.g., notification of "being X") may be performed not only explicitly but also by implicitly (e.g., by not performing notification of predetermined information or performing other information).

Judging may be performed by a value (0 or 1) represented by one bit, a Boolean value represented by true or false, or comparison of numerical values (e.g., comparison with predetermined value).

Regardless of whether or not being referred to as software, firmware, middleware, a microcode, a hardware description language, or other names, software should be widely interpreted so as to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, instructions, information, and the like may be transmitted/received via a transmission medium. For example, when the software is transmitted from a website, a server, or another remote source by using at least one of wired technology (e.g., coaxial cable, optical fiber cable, twisted pair, and digital subscriber line (DSL)) and wireless technology (e.g., infrared rays and microwaves), at least one of the wired technology and the wireless technology is included in the definition of the transmission medium.

The terms "system" and "network" used in the present disclosure can be used interchangeably. The "network" may mean an apparatus (e.g., base station) included in the network.

In the present disclosure, the terms such as "precoding", "precoder", "weight (precoding weight)", "quasi-co-location (QCL)", "transmission configuration indication state (TCI state)", "spatial relation", "spatial domain filter", "transmission power", "phase rotation", "antenna port", "antenna port group", "layer", "layer number", "rank", "resource", "resource set", "resource group", "beam", "beam width", "beam angle", "antenna", "antenna element", and "panel" can be interchangeably used.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier" can be interchangeably used. The base station may be referred to by a term such as a macro cell, a small cell, a femto cell, and a pico cell.

The base station can accommodate one or a plurality of (e.g., three) cells. In a case where the base station accommodates a plurality of cells, the entire coverage area of the base station can be partitioned into a plurality of smaller areas, and each smaller area can provide communication services through a base station subsystem (for example, small remote radio head (RRH) for indoors). The term "cell" or "sector" refers to a part or the whole of a coverage area of at least one of a base station and a base station subsystem that perform communication service in the coverage.

In the present disclosure, the terms such as "mobile station (MS)", "user terminal", "user equipment (UE)", and "terminal" can be interchangeably used.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, and a client, or by another appropriate term.

At least one of the base station and the mobile station may be referred to as a transmission apparatus, a reception apparatus, a radio communication apparatus, and the like. Note that at least one of the base station and the mobile station may be a device mounted on a moving body, a moving body itself, and the like. The moving body may be a transportation (for example, a car, an airplane and the like), an unmanned moving body (for example, a drone, an autonomous car, and the like), or a (manned or unmanned) robot. Note that at least one of the base station and the mobile station also includes an apparatus that does not necessarily move during a communication operation. For example, at least one of the base station and the mobile station may be an Internet of Things (IoT) device such as a sensor.

The base station in the present disclosure may be replaced with a user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In the case, the user terminal 20 may have the function of the above-described base station 10. Further, terms such as "uplink" and "downlink" may be replaced with terms corresponding to communication between terminals (for example, "side"). For example, an uplink channel, a downlink channel, and the like may be replaced with a side channel.

Similarly, the user terminal in the present disclosure may be replaced with a base station. In the case, the base station 10 may have the function of the above-described user terminal 20

In the present disclosure, the operation performed by a base station may be performed by an upper node thereof in some cases. In a network including one or a plurality of network nodes having a base station, it is clear that various operations performed for communication with a terminal can be performed by a base station, one or more network nodes other than the base station (e.g., mobility management entity (MME) and serving-gateway (S-GW) can be considered, but are not limiting), or a combination thereof.

Each aspect/embodiment described in the present disclosure may be used independently, in combination, or by being switched along with execution. Further, the order of processing procedures, sequences, flowcharts, and the like of the aspects/embodiments described in the present disclosure may be re-ordered as long as there is no inconsistency. For example, various step elements in the methods described in the present disclosure are presented by using illustrative orders, and the methods are not limited to the presented specific orders.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), new-radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or other appropriate radio communication methods, a next generation system expanded based thereon, and the like. A plurality of systems may be combined (e.g., combination of LTE or LTE-A and 5G) and applied.

The phrase "based on" used in the present disclosure does not mean "based only on", unless otherwise specified. In other words, the phrase "based on" means both "based only on" and "based at least on".

Any reference to an element using designations such as "first" and "second" used in the present disclosure does not generally limit the amount or order of these elements. These designations can be used in the present disclosure, as a convenient way of distinguishing between two or more elements. Thus, reference to the first and second elements does not mean that only two elements can be adopted or that the first element must precede the second element in some way.

The term "deciding (determining)" used in the present disclosure may include a wide variety of operations. For example, "deciding (determining)" may be regarded as "deciding (determining)" judging, calculating, computing, processing, deriving, investigating, looking up, search, inquiry (e.g., looking up in table, database, or another data structure), ascertaining, and the like.

"Deciding (determining)" may be regarded as "deciding (determining)" receiving (e.g., receiving information), transmitting (e.g., transmitting information), input, output, accessing (e.g., accessing data in memory), and the like.

"Deciding (determining)" may be regarded as "deciding (determining)" resolving, selecting, choosing, establishing, comparing, and the like. That is, "deciding (determining)" may be regarded as "deciding (determining)" some operation.

"Deciding (determining)" may be replaced with "assuming", "expecting", "considering", and the like.

The terms "connected" and "coupled", or any variation thereof used in the present disclosure may mean that two or more elements are directly or indirectly connected or coupled, and can include the existence of one or more intermediate elements between two elements "connected" or "coupled" with each other. The coupling or connection between the elements may be physical, logical or a combination of these. For example, "connection" may be replaced with "access".

In the present disclosure, when two elements are connected, it can be considered that the two elements are "connected" or "coupled" with each other by using one or more electrical wires, cables, printed electrical connection, and the like and using, as some non-limiting and non-inclusive examples, electromagnetic energy having a wavelength in a radio frequency domain, a microwave domain, and a (both visible and invisible) light domain, and the like.

In the present disclosure, the phrase "A and B are different" may mean that "A and B are different from each other". Note that the description may mean that "A and B are different from C". The terms such as "leave", "coupled", and the like may be interpreted similarly to "different".

When the terms such as "include", "including", and variations thereof are used in the present disclosure, these terms are intended to be inclusive similarly to the term "comprising". The term "or" used in the present disclosure is intended not to be exclusive-OR.

In the present disclosure, for example, when an article in English, such as a, an, and the, is added in translation, the present disclosure may include that the noun that follows these articles is in the plural form.

Although the invention according to the present disclosure has been described in detail above, it is obvious to a person skilled in the art that the invention according to the present disclosure is not limited to the embodiments described in the present disclosure. The invention according to the present disclosure can be embodied with various corrections and in various modified aspects, without departing from the spirit and scope of the invention defined on the basis of the description of claims. Consequently, the description of the present disclosure is provided only for the purpose of explaining examples, and should by no means be construed to limit the invention according to the present disclosure in any way.

The invention claimed is:

1. A terminal comprising:
   a receiving section that receives downlink control information indicating reception of a downlink signal; and
   a control section that determines one quasi co-location (QCL) assumption of a first QCL assumption and a second QCL assumption, wherein the one QCL assumption is applied to the downlink signal, the first QCL assumption is applied to the downlink signal in a first case that the downlink signal starts in a first period from the receiving of the downlink control information to elapse of a specific time, the second QCL assumption is applied to the downlink signal in a second case that the downlink signal starts in a second period after the first period, and the first QCL assumption is different from the second QCL assumption.

2. The terminal according to claim 1, wherein the second QCL assumption is a transmission configuration indication (TCI) state indicated by the downlink control information.

3. The terminal according to claim 1, wherein the first QCL assumption is a QCL assumption of a specific control resource set, and the specific control resource set corresponds to a lowest control resource set ID in a monitored latest slot and is associated with a monitored search space set.

4. The terminal according to claim 1, wherein the second QCL assumption is a transmission configuration indication (TCI) state or a QCL assumption applied to the downlink control information.

5. The terminal according to claim 1, wherein the downlink signal is a physical downlink shared channel.

6. The terminal according to claim 1, wherein the first QCL assumption is a QCL assumption of another downlink signal transmitted in a same symbol as the downlink signal.

7. The terminal according to claim 3, wherein the downlink signal is a channel state information reference signal (CSI-RS).

8. The terminal according to claim 1, wherein the control section reports capability information indicating the specific time.

9. A radio communication method for a terminal comprising:
receiving downlink control information indicating reception of a downlink signal; and
determining one quasi co-location (QCL) assumption of a first QCL assumption and a second QCL assumption, wherein the one QCL assumption is applied to the downlink signal, the first QCL assumption is applied to the downlink signal in a first case that the downlink signal starts in a first period from the receiving of the downlink control information to elapse of a specific time, the second QCL assumption is applied to the downlink signal in a second case that the downlink signal starts in a second period after the first period, and the first QCL assumption is different from the second QCL assumption.

10. A base station comprising:
a receiving section that receives capability information indicating a specific time; and
a control section that determines one quasi co-location (QCL) assumption of a first QCL assumption and a second QCL assumption, wherein the one QCL assumption is applied to the downlink signal, the first QCL assumption is applied to the downlink signal in a first case that the downlink signal starts in a first period from the receiving of the downlink control information to elapse of the specific time, the second QCL assumption is applied to the downlink signal in a second case that the downlink signal starts in a second period after the first period, and the first QCL assumption is different from the second QCL assumption.

11. A system comprising a terminal and a base station, wherein
the terminal comprises:
a receiving section that receives downlink control information indicating reception of a downlink signal; and
a control section that determines one quasi co-location (QCL) assumption of a first QCL assumption and a second QCL assumption, wherein the one QCL assumption is applied to the downlink signal, the first QCL assumption is applied to the downlink signal in a first case that the downlink signal starts in a first period from the receiving of the downlink control information to elapse of a specific time, the second QCL assumption is applied to the downlink signal in a second case that the downlink signal starts in a second period after the first period, and the first QCL assumption is different from the second QCL assumption, and
the base station transmits the downlink control information.

12. The terminal according to claim 2, wherein the first QCL assumption is a QCL assumption of a specific control resource set, and the specific control resource set corresponds to a lowest control resource set ID in a monitored latest slot and is associated with a monitored search space set.

13. The terminal according to claim 2, wherein the downlink signal is a physical downlink shared channel.

14. The terminal according to claim 3, wherein the downlink signal is a physical downlink shared channel.

15. The terminal according to claim 4, wherein the downlink signal is a physical downlink shared channel.

16. The terminal according to claim 2, wherein the first QCL assumption is a QCL assumption of another downlink signal transmitted in a same symbol as the downlink signal.

17. The terminal according to claim 4, wherein the downlink signal is a channel state information reference signal (CSI-RS).

18. The terminal according to claim 5, wherein the downlink signal is a channel state information reference signal (CSI-RS).

19. The terminal according to claim 6, wherein the downlink signal is a channel state information reference signal (CSI-RS).

20. The terminal according to claim 2, wherein the control section reports capability information indicating the specific time.

* * * * *